United States Patent
Harada et al.

(10) Patent No.: US 11,360,758 B2
(45) Date of Patent: Jun. 14, 2022

(54) COMMUNICATION PROCESSING DEVICE, INFORMATION PROCESSING DEVICE, AND COMMUNICATION PROCESSING DEVICE CONTROL METHOD

(71) Applicant: NIPPON TELEGRAPH AND TELEPHONE CORPORATION, Tokyo (JP)

(72) Inventors: Takumi Harada, Yokosuka (JP); Hirotaka Ujikawa, Yokosuka (JP); Manabu Yoshino, Yokosuka (JP); Noriyuki Oota, Yokosuka (JP); Kenichi Suzuki, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 241 days.

(21) Appl. No.: 16/488,864

(22) PCT Filed: Feb. 28, 2018

(86) PCT No.: PCT/JP2018/007549
§ 371 (c)(1),
(2) Date: Aug. 26, 2019

(87) PCT Pub. No.: WO2018/159691
PCT Pub. Date: Sep. 7, 2018

(65) Prior Publication Data
US 2019/0377569 A1   Dec. 12, 2019

(30) Foreign Application Priority Data

Feb. 28, 2017  (JP) .............................. JP2017-036929
Jul. 19, 2017  (JP) .............................. JP2017-140265
Aug. 25, 2017  (JP) .............................. JP2017-162703

(51) Int. Cl.
*G06F 8/65*    (2018.01)
*G06F 8/654*   (2018.01)
(Continued)

(52) U.S. Cl.
CPC ................ *G06F 8/65* (2013.01); *G06F 8/654* (2018.02); *H04B 10/27* (2013.01); *H04L 41/082* (2013.01); *H04L 67/34* (2013.01)

(58) Field of Classification Search
CPC ....... G06F 8/654; H04B 10/27; H04L 41/082; H04L 67/34
See application file for complete search history.

(56) References Cited

U.S. PATENT DOCUMENTS

2003/0084434 A1   5/2003 Ren
2006/0200502 A1*  9/2006 Tanaka .................... G06F 8/658
(Continued)

FOREIGN PATENT DOCUMENTS

JP       H0962502 A       3/1997
JP     2004-090232 A      3/2004
(Continued)

OTHER PUBLICATIONS

A. Kotani et al., A Software Update Method for Embedded Linux Systems, The 66th National Convention of IPSJ, 2004.
(Continued)

*Primary Examiner* — Jacob D Dascomb
(74) *Attorney, Agent, or Firm* — Harness, Dickey & Pierce, P.L.C.

(57) ABSTRACT

A communication processing device including: a memory that stores data relating to a pre-update firmware, and second data relating to a post-update firmware, and that stores first reference destination address indicating the storage area of reference destination included in the first data in association with the reference destination; a rewriting unit configured to
(Continued)

rewrite at least some of the first reference destination address stored in the memory with second reference destination address indicating the storage area of the reference destination in the second data; and a control unit configured to, when referring to the reference destination in the first data, refer to the second data on the basis of the second reference destination address stored in the memory.

13 Claims, 11 Drawing Sheets

(51) Int. Cl.
  H04B 10/27 (2013.01)
  H04L 41/082 (2022.01)
  H04L 67/00 (2022.01)

(56) References Cited

U.S. PATENT DOCUMENTS

| 2007/0089108 A1* | 4/2007 | Chen | G06F 8/65 717/168 |
| 2014/0189203 A1* | 7/2014 | Suzuki | G06F 12/0868 711/103 |
| 2015/0295753 A1* | 10/2015 | Honda | H04L 41/082 709/221 |
| 2015/0370558 A1* | 12/2015 | Gschwind | G06F 8/443 712/225 |
| 2015/0370727 A1* | 12/2015 | Hashimoto | G06F 12/145 711/163 |
| 2017/0031671 A1* | 2/2017 | Joshi | G06F 8/654 |

FOREIGN PATENT DOCUMENTS

| JP | 2009-272764 A | 11/2009 |
| JP | 2010-130620 A | 6/2010 |

OTHER PUBLICATIONS

International Search Report (English and Japanese) issued for International Application No. PCT/JP2018/007549, dated Jun. 5, 2018; ISA/JP.

* cited by examiner

COMMUNICATION PROCESSING DEVICE, INFORMATION PROCESSING DEVICE, AND COMMUNICATION PROCESSING DEVICE CONTROL METHOD

CROSS-REFERENCE TO RELATED APPLICATIONS

This application is a 371 U.S. National Phase of International Application No. PCT/JP2018/007549, filed on Feb. 28, 2018, which claims priority to Japanese Application No. 2017-036929, filed Feb. 28, 2017, Japanese Patent Application No. 2017-140265, filed Jul. 19, 2017, and Japanese Patent Application No. 2017-162703, filed Aug. 25, 2017. The entire disclosures of the above applications are incorporated herein by reference.

TECHNICAL FIELD

The present invention relates to a communication processing device control method.

BACKGROUND ART

In communication devices that provide a communication service, it is necessary to update the firmware installed in the communication device when a new function is added or when a bug of a function is fixed. In order for the data within a volatile memory to be safely updated, it is required in the firmware update to rewrite the data after stopping all of the programs being executed within the volatile memory. Therefore, a restart of the communication device is sometimes required.

When a communication device is restarted, an interruption of the communication service arises until the communication device starts and enables programs to be executed. When an interruption of a communication service arises, the user utilizing the communication service is unable to use the network. Therefore, it is currently difficult for a firmware to be updated while a service is in operation.

The same problem occurs in an OLT (Optical Line Terminal), which serves as a station side communication device used on an optical access network. In particular, because it is difficult to achieve communication device redundancy on an optical access network from an economic perspective, it is difficult for a firmware to be updated without an interruption of the communication service. Consequently, it is impossible to use methods such as those that avoid a service interruption by temporarily switching from an active system to a redundant system at the time of a firmware update. Therefore, with current OLT device configurations, it is difficult for a firmware update to be realized without a service interruption. Here, an OLT is a device that realizes communications with another communication device such as a subscriber line terminal device (ONU: Optical Network Unit) by means of optical signals passing through an optical communication network. The optical communication network to which an OLT is connected is, for example, a passive optical communication network such as a PON (Passive Optical Network). An ONU is a device that realizes communications with another communication device by means of optical signals passing through a communication network. An ONU may be configured using a plurality of devices. An ONU is, for example, installed inside a user's home which receives communication services.

In terms of performing a firmware update, given that a firmware is used by being deployed from a ROM (Read Only Memory) to a memory upon starting the communication device, it is known that there is a technique where an update is completed by rewriting a pre-update firmware stored in the ROM with a post-update firmware, and then deploying the post-update firmware to the memory when the communication device is next started (for example, refer to Non-Patent Literature 1).

CITATION LIST

Non-Patent Literature

[Non-Patent Literature 1] Akira Kotani, Ryozo Kiyohara, Atsushi Settsu, Taizo Kittaka, "A Software Update Method for Embedded Linux Systems (1)", 66th National Meeting of the Information Processing Society of Japan.

SUMMARY OF INVENTION

Problem to be Solved by the Invention

As described above, when a communication device is restarted to carry out a firmware update, a service interruption arises due to a communication interruption which occurs when the communication device is powered down, and lasts until the communication device is capable of being used again.

Furthermore, a communication device becomes capable of communication as a result of a firmware written in a ROM being deployed to a memory when the communication device is started. However, if the memory is rewritten directly during operation of the communication device, there is a concern that an unexpected abnormality could occur in the communication device.

In terms of methods for reducing the firmware update time, known is a method that, by pre-writing a post-update firmware having additional new functions and the like (hereunder referred to as "post-update firmware") to the free space of a ROM, starts a communication device in a state where both a pre-update firmware not having additional new functions and the like (hereunder referred to as "pre-update firmware") and the post-update firmware are stored in the ROM, and selects one of the firmware when the communication device is started. In this case, although the time required to write the firmware to the ROM is reduced, the firmware to be started can only be selected when the communication device is next started. Consequently, it is necessary to rewrite the firmware in the memory if a firmware update is to be reflected while a service is in operation. However, a restart of the communication device is unavoidable if the post-update firmware stored in the ROM is to be reflected in the memory.

Furthermore, a proposal has been made to a method that realizes a firmware update without a service interruption by applying a PON protection to the firmware update. In this method, a communication device written with a post-update firmware is provided for performing the update, and the routing is physically switched from a communication device written with a pre-update firmware to the communication device for performing the update. Here, PON protection refers to a method that provides the communication device for performing the update, and reduces the duration of a communication interruption when a failure occurs by physically switching the routing.

However, in optical access devices such as OLTs, a plurality of ONUs can sometimes be connected to a single optical access device by using an optical splitter. In such cases, to enable the functions of the optical access device to be updated, the physical device configuration and communication routing must be changed in order to switch to the optical access device for performing the update. Further, it is necessary for an optical access device for performing the update which is unused during normal operation to be constantly provided, and an optical switch for switching the routing to the optical access device for performing the update is also required.

Moreover, from an economic perspective, there are many configurations in which an optical access device for performing the update is not prepared. Consequently, it is difficult from an economic perspective for a firmware update without a service interruption to be performed by applying a PON protection to the firmware update.

In light of the above circumstances, the present invention has an object of providing an optical access device capable of performing a firmware update without causing a communication interruption.

Means for Solving the Problem

A communication processing device according to an aspect of the present invention includes: a memory that stores first data relating to a pre-update firmware, and second data relating to a post-update firmware, and that stores first reference destination address indicating the storage area of reference destination included in the first data in association with the reference destination; a rewriting unit configured to rewrite at least some of the first reference destination address stored in the memory with second reference destination address indicating the storage area of the reference destination in the second data; and a control unit configured to, when referring to the reference destination in the first data, refer to the second data on the basis of the second reference destination address stored in the memory.

According to an aspect of the present invention, the rewriting unit of the communication processing device described above rewrites the first reference destination address stored in the memory with second reference destination address according to a rewrite instruction.

According to an aspect of the present invention, the rewriting unit of the communication processing device described above rewrites the first reference destination address stored in the memory with the second reference destination address obtained by adding a predetermined offset value to the first reference destination address.

An aspect of the present invention is a communication processing device described above, wherein the memory further stores data relating to a platform firmware, wherein the control unit, when referring to the reference destination in the first data via the platform firmware that is referred to, refers to the second data on the basis of the second reference destination address stored in the memory.

According to an aspect of the present invention, the communication processing device described above further includes further includes a writing unit configured to write the second data to the free storage area when the memory has a free storage area for the second data to be written.

According to an aspect of the present invention, the communication processing device of the communication processing device described above further includes a stop processing unit configured to set a guard time duration, wherein the control unit stops, for the guard time duration set by the stop processing unit, all processing except for the processing by the rewriting unit that rewrites the first reference destination address with second reference destination address, or all processing except for processing having a higher priority than the rewrite processing.

According to an aspect of the present invention, the rewriting unit of the communication processing device described above determines whether or not either the number of first reference destination addresses targeted for rewriting is greater than or equal to a threshold value or the restriction duration of the functions that are restricted by the rewrite processing is greater than or equal to a threshold value, and the stop processing unit sets the guard time on the basis of at least either the number of rewrites or the restriction duration if at least either the number of rewrites or the restriction duration is determined to be greater than or equal to the threshold value.

According to an aspect of the present invention, when third data representing other data relating to the post-update firmware is stored in the memory, the rewriting unit of the communication processing device described above rewrites at least some of the first reference destination address with second reference destination address or with third reference destination address indicating the storage area of the reference destination in the third data, or rewrites at least some of the second reference destination address with third reference destination address.

According to an aspect of the present invention, in the communication processing device described above, the value of second variable, which is stored in a different area to the storage area of the first data and hold reference destination address indicating the storage areas of at least some first variable among the variables included in the second data, is rewritten with first variable reference destination address indicating the storage area of the first variables in the first data, and the control unit refers to the first variable on the basis of the first variable reference destination address held by the second variable.

According to an aspect of the present invention, the rewriting unit of the communication processing device described above performs the rewrite with respect to the first variable commonly included in the first data and the second data.

According to an aspect of the present invention, the rewriting unit of the communication processing device described above rewrites, when third data representing other data relating to the post-update firmware is stored in the memory, the values of third variable, which is stored in a different area to the storage areas of the first and second data and hold reference destination address indicating the storage area of at least some of the first variable, with the first variable reference destination addresses or with the reference destination address held by the second variable.

According to an aspect of the present invention, the communication processing device described above further includes a communication unit configure to communicate on the basis of the second data referred to by the control unit.

An information processing device according to an aspect of the present invention includes: a memory that stores first data which is data relating to a pre-update firmware, and second data which is data relating to a post-update firmware, and that stores first reference destination address indicating the storage area of reference destinations included in the first data in association with the reference destination; and a control unit configured to refer to the memory. The control unit rewrites at least some of the first reference destination address stored in the memory with second reference destination address indicating the storage area of the reference destination in the second data, and refers to the second data on the basis of the second reference destination address stored in the memory when referring to the reference destination in the first data.

A communication processing device control method according to an aspect of the present invention includes the steps of: storing first data which is data relating to a pre-update firmware, and second data which is data relating to a post-update firmware, and storing first reference destination address indicating the storage area of reference destination included in the first data in association with the reference destination; rewriting at least some of the first reference destination address with second reference destination address indicating the storage area of the reference destination in the second data; and referring to the second data on the basis of the stored second reference destination address when referring to the reference destination in the first data.

Effects of the Invention

The present invention enables a firmware to be updated without causing a communication interruption.

EMBODIMENTS FOR CARRYING OUT THE INVENTION

Modes for carrying out the present invention will be described with reference to the drawings. The embodiments described below are merely examples, and embodiments to which the present invention can be applied are in no way limited to the embodiments below.

In the diagrams used to describe the embodiments, the same reference symbols are given to components having the same function, and repeated explanation is omitted.

(First Embodiment)

Figure 1:
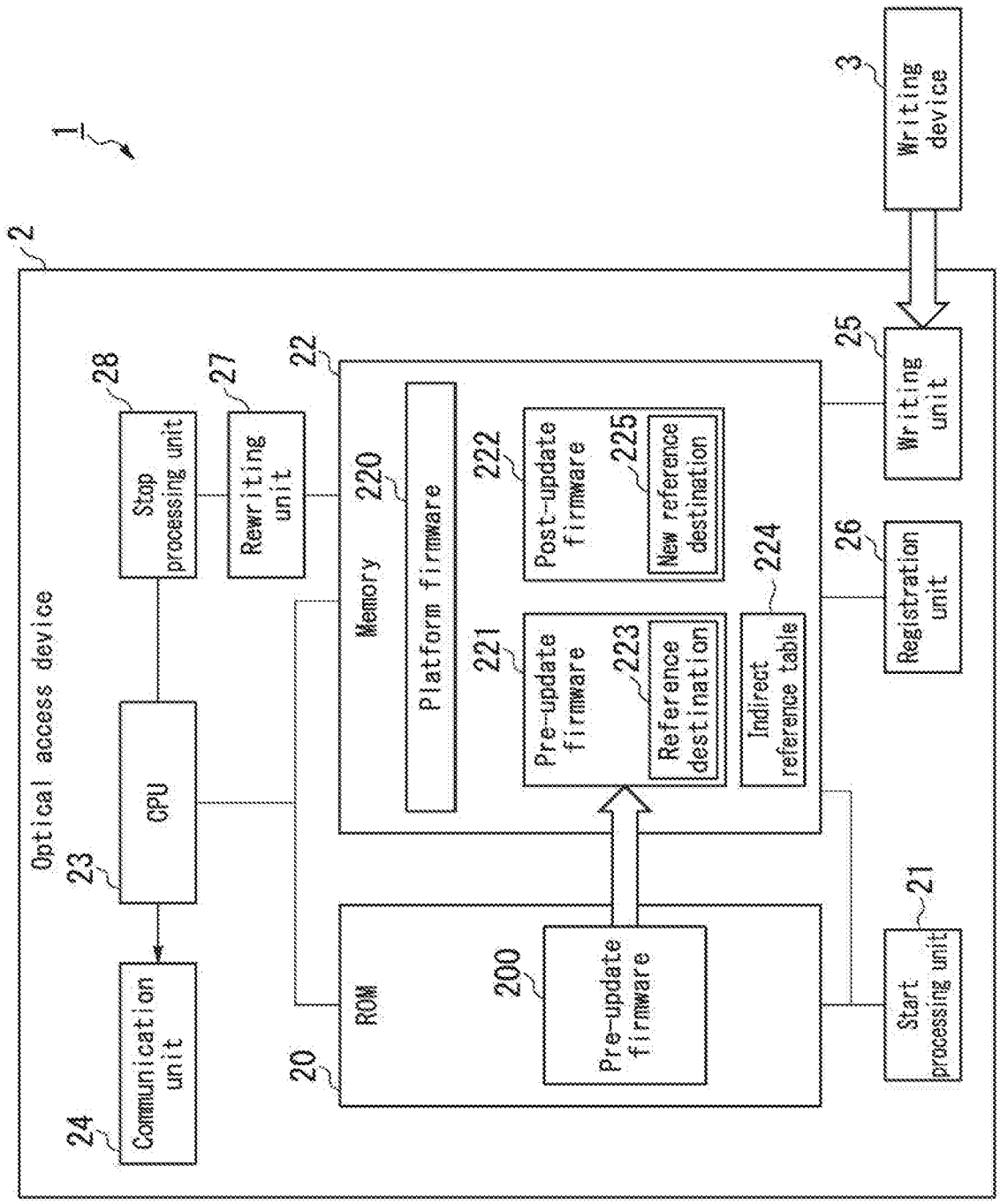
FIG. 1 is a diagram showing an example of an optical communication system according to a first exemplary embodiment.

FIG. 1 is a diagram showing an example of an optical communication system according to a first exemplary embodiment. The optical communication system is a system that performs communication using optical signals. The optical communication system 1 includes an optical access device 2 and a writing device 3.

The optical access device 2 is a communication device such as an OLE The optical access device 2 includes a ROM (Read Only Memory) 20, a start processing unit 21, a memory 22, a CPU (Central Processing Unit) 23, a communication unit 24, a writing unit 25, a registration unit 26, a rewriting unit 27, and a stop processing unit 28. The optical access device 2 may further include a non-volatile recording medium (non-temporary recording medium) such as a magnetic hard disk device or a semiconductor storage device.

The writing device 3 is an information processing device such as a personal computer. The writing device 3 stores a post-update firmware 222. The post-update firmware 222 is, for example, a firmware that enables the optical access device 2 to execute optical communication.

If the writing device 3 overwrites a pre-update firmware 221 in the memory 22 with the post-update firmware 222 while the CPU 23 is using the pre-update firmware 221, an unexpected abnormality can sometimes occur in the optical access device 2. Therefore, the writing device 3 stores the post-update firmware 222 in the free space of the memory 22 so as to not rewrite the pre-update firmware 221 stored in the memory 22. As a result, if the post-update firmware 222 is stored in the free space of the memory 22, the writing device 3 is capable of storing the post-update firmware 222 in the memory 22 even while the CPU 23 is using the pre-update firmware 221.

The free space of the memory 22 refers to an area not written with the pre-update firmware 221 or information currently in use. Therefore, the free space may also refer to an area written with a firmware which is no longer used due to a previous update.

The writing device 3 may write the entire post-update firmware 222 or a difference data between the pre-update firmware 221 and the post-update firmware 222 to the memory 22.

Furthermore, the optical access device 2 of the first exemplary embodiment switches from processing function data or the like included in the pre-update firmware 221 to processing function data or the like included in the post-update firmware 222 by means of indirect referencing. Specifically, the optical access device 2 of the first exemplary embodiment rewrites the addresses of the function data or the like included in the pre-update firmware 221 with the addresses of the function data or the like included in the post-update firmware 222.

Here, an indirect reference preserves the entry points of a function, variable value, or the like at a call destination. It is possible to call a specified function, variable value, or the like by rewriting the value of an entry points. The entry point of a function indicates the memory address from which the function is written in the firmware.

Next, the optical access device 2 will be described in detail.

The CPU 23 realizes the start processing unit 21 by executing a program stored in the ROM 20 or the like. In this case, the start processing unit 21 writes the pre-update firmware 200 stored in the ROM 20 to the memory 22 as the pre-update firmware 221 at the time of start up.

The start processing unit 21 may be realized by using a LSI (Large Scale Integration) such as an ASIC (Application Specific Integrated Circuit), or hardware such as a FPGA (Field-Programmable Gate Array) or a GPU (Graphics Processing Unit). Hereunder, a case where the start processing unit 21 is realized by hardware or the like will be illustrated. In this case, when the optical access device 2 is started, the start processing unit 21 writes the pre-update firmware 200 stored in the ROM 20 to the memory 22 as the pre-update firmware 221 before activation of the CPU 23. The pre-update firmware 200 is, for example, a firmware that enables the optical access device 2 to execute optical communication.

Furthermore, when the optical access device 2 is started, the start processing unit 21 writes a platform firmware 220 stored in a non-volatile recording medium such as the ROM 20 to the memory 22 before activation of the CPU 23. The description is continued below for the case where the ROM 20 is applied as an example of the non-volatile recording medium. The platform firmware 220 is, for example, a firmware such as an operating system. The platform firmware 220 is a source that calls the function data of the pre-update firmware 221 and the post-update firmware 222.

The storage medium that stores the pre-update firmware 200 is not limited to the ROM 20. The storage medium that stores the pre-update firmware 200 may be any memory area that is referred to at the time of start up, such as a HDD, an optical disk, or an external memory. Furthermore, the storage medium that stores the pre-update firmware 200 may be a volatile memory as long as volatilization does not occur during start processing. Moreover, the storage medium that stores the pre-update firmware 200 may also be a storage area such as a memory provided by a server or a cloud, with respect to the optical access device 2, or a VM relating to the optical access device 2.

The ROM 20 is a read-only recording medium. The ROM 20 may also be a rewritable flash ROM. The ROM 20 stores the pre-update firmware 200. The ROM 20 does not store the post-update firmware 222. The pre-update firmware 200 is stored in the ROM 20 such that the CPU 23 is capable of operating even when referred to by the CPU 23. That is to say, the binary data of the pre-update firmware 200 is equivalent to the binary data of the pre-update firmware 221.

The memory 22 is a volatile recording medium such as a RAM (Random Access Memory). The memory 22 only needs to be rewritable. The memory 22 may also be a writable non-volatile recording medium, a register, a FPGA, or the like.

The memory 22 stores the platform firmware 220 when the optical access device 2 is started by means of a write operation performed by the start processing unit 21. Furthermore, the pre-update firmware 221 is stored in the memory 22 when the optical access device 2 is started by means of a write operation performed by the start processing unit 21. The memory 22 is provided with a free space having a sufficient capacity even after storing the platform firmware 220 and the pre-update firmware 221. A sufficient capacity refers to a capacity that at least allows the post-update firmware 222 to be stored. The post-update firmware 222 output by the writing device 3 is stored in the free space of the memory 22. For example, the post-update firmware 222 is stored in the free space of the memory 22 after activation of the CPU 23.

The pre-update firmware 221 includes reference destinations 223 which represent function data, variable values, and the like. The function data is associated with a start address and the like of the storage area that stores the function data of the pre-update firmware 221 in the memory 22. The variable values are associated with a start address and the like of the storage area that stores the variables of the pre-update firmware 221 in the memory 22.

The post-update firmware 222 includes new reference destinations 225 which represent function data, variable values, and the like. The function data is associated with a start address and the like of the storage area that stores the function data of the post-update firmware 222. The variable values are associated with a start address and the like of the storage area that stores the variables of the post-update firmware 222 in the memory 22.

The memory 22 further stores an indirect reference table 224. The indirect reference table 224 represents data in a table format that associates the function data and variable values with the start addresses of the storage areas that store the function data and variable values and the like.

The CPU 23 is a computation device. The CPU 23 controls the operation of the respective its of the optical access device 2. The CPU 23 realizes the functions of the writing unit 25, the registration unit 26, the rewriting unit 27, and the stop processing unit 28 by executing programs stored in the memory 22 and the like. Alternatively, the writing unit 25, the registration unit 26, the rewriting unit 27, and the stop processing unit 28 and the like may be realized using a LSI such as an ASIC, or hardware such as a FPGA or a GPU. The CPU 23, an LSI such as an ASIC, or hardware such as a FPGA or a GPU correspond to a control unit.

The CPU 23 executes operations based on the programs as a result of reading the platform firmware 220, the pre-update firmware 221, or the post-update firmware 222 stored in the volatile memory 22.

The writing unit 25 may acquire the post-update firmware 222, which is the firmware following the update, via the communication unit 24. The writing unit 25 may also acquire the post-update firmware 222 from an external storage medium such as a CD-ROM.

The writing unit 25 stores the post-update firmware 222 in the volatile memory 22. The writing unit 25 determines whether or not the post-update firmware 222 can be written in the free space of the memory 22, based on a write request which is output by the writing device 3. Here, the write request includes information indicating the size of the post-update firmware 222.

Specifically, the writing unit 25 determines, on the basis of the size of the post-update firmware 222 included in the write request, whether or not the free space in the memory 22 is at least the size of the post-update firmware 222. If the free space in the memory 22 is at least the size of the post-update firmware 222, the writing unit 25 writes the post-update firmware 222 to the memory 22. The writing unit 25 may write the entire post-update firmware 222 or a difference data between the pre-update firmware 221 and the post-update firmware 222 to the memory 22.

On the other hand, if the free space in the memory 22 is less than the size of the post-update firmware 222, the writing unit 25 does not write the post-update firmware 222 to the memory 22. If the free space in the memory 22 is less than the size of the post-update firmware 222, the writing unit 25 may provide a notification that the free space in the memory 22 is less than the size of the post-update firmware 222. The size of the free space may be determined before the post-update firmware 222 is written to the memory 22. The post-update firmware 222 is written to the memory 22 according to the determination result.

If the start processing unit 21 has written the pre-update firmware 200 stored in the ROM 20 to the memory 22, the registration unit 26 records to the indirect reference table 224, the reference destinations 223 included in the pre-update firmware 221, and reference destination addresses which represent start addresses of the storage areas of the reference destinations 223. Specifically, the entry points of the functions held inside the data area of the pre-update firmware 221 are stored in the memory 22, The registration unit 26 records the entry points of the functions stored in the memory 22 as reference destination addresses. In other words, the registration unit 26 records associations between the pointers of the functions of the pre-update firmware 221 and the reference destination addresses of the functions. That is to say, the registration unit 26 assigns reference destination addresses to the function pointers.

The indirect reference table 224 is not necessarily recorded by the registration unit 26 when the pre-update firmware 200 is written to the memory 22. The indirect reference table 224 may be recorded by linkers and the like when the pre-update firmware 221 is compiled.

If the writing unit 25 writes the post-update firmware 222 to the memory 22, the rewriting unit 27 records to the indirect reference table 224, the new reference destinations 225 included in the post-update firmware 222, and new reference destination addresses which represent start addresses of the storage areas of the new reference destinations 225. Furthermore, the rewriting unit 27 rewrites the reference destination addresses stored in association with the reference destinations 223 stored in the indirect reference table 224, with new reference destination addresses.

If the post-update firmware 222 is only stored in the memory 22, the CPU 23 is capable of referring only to the data relating to the pre-update firmware 221. Consequently, the rewriting unit 27 rewrites the reference destination addresses stored in the indirect reference table 224 referred to by the CPU 23 such that the reference destination addresses point to the addresses of the storage areas of the new reference destinations 225. As a result, the CPU 23 refers to the new reference destinations 225.

Specifically, the rewriting unit 27 writes (records) the values of the function pointers that are written when the post-update firmware 222 is compiled to the indirect reference table 224 as new reference destination addresses, which are associated with the new reference destinations 225. Furthermore, the rewriting unit 27 rewrites the reference destination addresses, which are stored in the indirect reference table 224 in association with the reference destinations 223, with the values of the function pointers that are written when the post-update firmware 222 is compiled. The post-update firmware 222 is programmed using function pointers and the like. Consequently, space for the entry points of the post-update firmware 222 that store the function data, is secured when the post-update firmware 222 is compiled.

The new reference destination addresses are created when the post-update firmware 222 is compiled. Because the new reference destinations that are created refer to memory addresses specified by the post-update firmware 222, they do not dynamically change.

As a result of the above, the new reference destination addresses of the post-update firmware 222 can be known in advance. Furthermore, the rewriting unit 27 rewrites the reference destination addresses stored in association with the reference destinations 223 included in the pre-update firmware 221 with new reference destination addresses. Consequently, the new reference destinations 225 included in the post-update firmware 222 can be called.

The rewriting unit 27, for example, rewrites the indirect reference table 224 in response to a rewrite instruction. The rewrite instruction is input, for example, by a command line entered through the operating system. The rewrite instruction is input by a program or a user. The rewrite instruction includes information that identifies the functions whose reference destination addresses are rewrite targets. The rewrite instruction may further include new reference destination addresses of the functions whose reference destination addresses are rewrite targets.

Furthermore, the rewriting unit 27 may determine whether or not the number of reference destination addresses to be rewritten is at least a threshold value. if the number of reference destination addresses to be rewritten is less than the threshold value, the rewriting unit 27 performs processing that rewrites the reference destination addresses stored in association with the reference destinations 223 included in the pre-update firmware 221 described above, with new reference destination addresses.

On the other hand, if the number of reference destination addresses to be rewritten is at least the threshold value, the rewriting unit 27 outputs information to the stop processing unit 28 indicating that the number of reference destination address to be rewritten is at least the threshold value. The rewriting unit 27 may also rewrite the reference destination addresses stored in association with the reference destinations 223 included in the pre-update firmware 221, with new reference destination addresses without determining the number of reference destination addresses to be rewritten.

The rewriting unit 27, for example, performs rewrite processing of the indirect reference table 224 by calling a system call included in the operating system. The rewriting unit 27, for example, may execute rewrite processing of the indirect reference table 224 by calling a system call using an interrupt handler. The processing performed by the rewriting unit 27 may be any type of processing that enables the data inside the memory 22 to be written or rewritten.

The rewriting unit 27 may also acquire new reference destination addresses using an offset value. The rewriting unit 27, for example, acquires new reference destination addresses by adding a predetermined offset value to the reference destination addresses stored in the indirect reference table 224. The rewriting unit 27 rewrites the reference destination addresses in the indirect reference table 224 with new reference destination addresses. As a result, the rewriting unit 27 rewrites the reference destination addresses of the function data of the pre-update firmware 200 subjected to a reference request by the CPU 23, with the reference destination addresses of the function data of the post-update firmware 222. The offset value is, for example, a value representing the difference between the start address value of the storage area of the pre-update firmware 221 and the start address value of the storage area of the post-update firmware 222.

The rewriting unit 27 may have, for example, a flag that indicates whether or not an offset value is used. If the offset value has a value of "1", the rewriting unit 27 adds an offset value to the reference destination addresses stored in the indirect reference table 224. On the other hand, if the offset value has a value of "0", the rewriting unit 27 refers to the reference destination addresses stored in the indirect reference table 224. Furthermore, a flag may be provided for each function.

Figure 2:
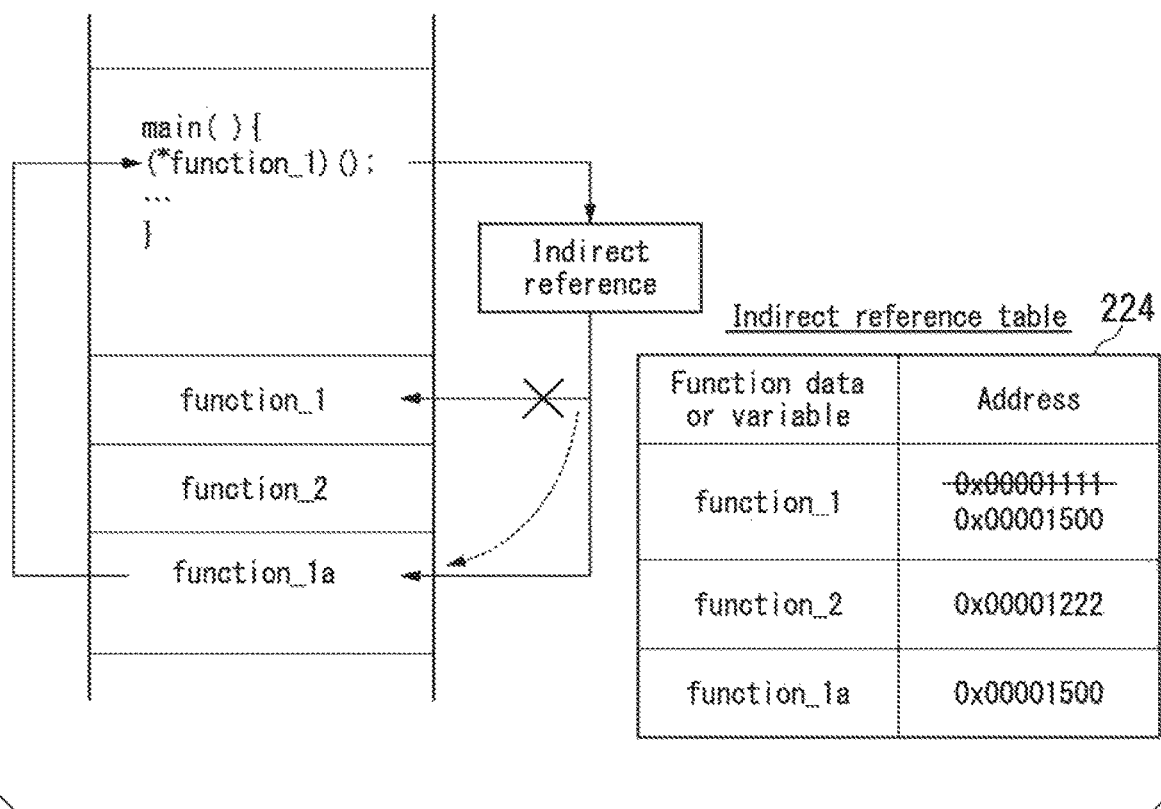
FIG. 2 is a diagram showing an indirect reference in an optical accelerator device according to the first exemplary embodiment.

FIG. 2 is a diagram showing an indirect reference in an optical access device according to the first exemplary embodiment. The example shown in FIG. 2 illustrates the processing performed when the post-update firmware 222 is written to the memory 22 in a state where the reference destinations 223 included in the pre-update firmware 221 and the reference destination addresses of the reference destinations 223 have been recorded in the indirect reference table 224.

When the post-update firmware 222 is written to the memory 22, the rewriting unit 27 records the new reference destinations 225 included in the post-update firmware 222 and new reference destination addresses of the new reference destinations 225. Furthermore, the rewriting unit 27 rewrites the reference destination addresses stored in association with the reference destinations 223 stored in the indirect reference table 224, with new reference destination addresses of the new reference destinations 225.

According to FIG. 2, a "function_1" included in the pre-update firmware 221 and a reference destination address "0x00001111" of the "function_1" are stored in association with each other in the indirect reference table 224. Further, a "function_2" included in the pre-update firmware 221 and a reference destination address "0x00001222" of the "function_2" are stored in association with each other in the indirect reference table 224.

When the post-update firmware 222 is written to the memory 22 in such a state, the rewriting unit 27 stores a "function_1a" included in the post-update firmware 222 and a reference destination address "0x00001500" of the "function_1a" in association with each other.

Further, the rewriting unit 27 rewrites the address "0x00001111" in association with the "function_1" stored inside the indirect reference table 224, with the address "0x00001500" stored in association with the "function_1a".

The description will now be continued returning to FIG. 1.

In those cases where information is acquired indicating that the total number of reference destination addresses to be rewritten which is output by the writing unit 25 is greater than or equal to a threshold value or the total processing duration associated with referencing is greater than or equal to a threshold value, the stop processing unit 28 sets a guard time on the basis of the total number of reference destination addresses to be rewritten. The guard time is the duration in which processing other than the rewrite processing is stopped.

Here, stop targets may include processing having a higher priority than the rewrite processing, or may be limited to processing having a priority equal to and/or lower than the rewrite processing. Processing having a higher priority than the rewrite processing has a low likelihood of abnormalities resulting from a write. Furthermore, because the duration of the higher-priority processing is not separately estimated, this provides the effect of enabling the threshold value to be set to a larger value. On the other hand, when the stop targets are limited to processing having a priority equal to and/or lower than the rewrite processing, a separate estimation of the influence of the duration of the higher-priority processing is needed, and requires the threshold value to be reduced by the duration of the higher-priority processing. However, this provides the effect of allowing the priorities to be obeyed.

The description below assumes a case where all processes other than the rewrite process are stopped. However, cases where the stop targets are limited to processing having a priority equal to and/or lower than the rewrite processing are equivalent. As described above, the rewrite processing refers to processing that rewrites the reference destination addresses in association with the reference destinations 223 stored inside the indirect reference table 224, with new reference destinations. In this manner, for example, on the basis of the guard time determined by the stop processing unit 28, the CPU 23 stops all processing other than the rewrite processing, or all processing other than processing having a higher priority than the rewrite processing, for the duration of the guard time.

Further, the stop processing unit 28 outputs a stop command that stops all processing other than the rewrite processing, to the platform firmware 220, the OS (Operating System), and the like. Here, the stop command includes information that indicates the guard time. Specifically, the stop processing unit 28 stores table format information that associates the number of reference destination addresses to be rewritten and the guard time. The stop processing unit 28 selects the guard time based the table format information, and sets the selected guard time.

The CPU 23 executes operations based on the platform firmware 220 stored in the memory 22, Furthermore, the CPU 23 executes operations based on the pre-update firmware 221 or the post-update firmware 222 according to the associations between the reference destinations 223 and the reference destination addresses, on the basis of the indirect reference table 224.

Specifically, the CPU 23 acquires new reference destination addresses if, in the indirect reference table 224, the new reference destination addresses of the post-update firmware 222 are associated with the reference destinations 223 included in the pre-update firmware 221. Further, the CPU 23 acquires the new reference destinations 225 stored at the acquired new reference destination addresses. The CPU 23 acquires the new reference destinations 225 stored at the new reference destination addresses of the post-update firmware 222, and then returns to the reference source.

In the indirect reference table 224, if the reference destination addresses of the pre-update firmware 221 are stored at the reference destinations 223 included in the pre-update firmware 221, the CPU 23 acquires the reference destinations 223 of the pre-update firmware 221. The CPU 23 refers to the reference destinations and the like of the pre-update firmware 221 for reference destinations other than the new reference destinations 225 and the like determined beforehand. In this manner, the CPU 23 acquires data relating to the pre-update firmware 221 or the post-update firmware 222 according to the reference destination addresses stored in the indirect reference table 224.

The communication unit 24 communicates with another communication device using an optical signal according to control by the CPU 23, which executes operations based on the pre-update firmware 221 or the post-update firmware 222. The other communication device may be an ONU for example.

(Operation of Optical Access Device)

Figure 3:
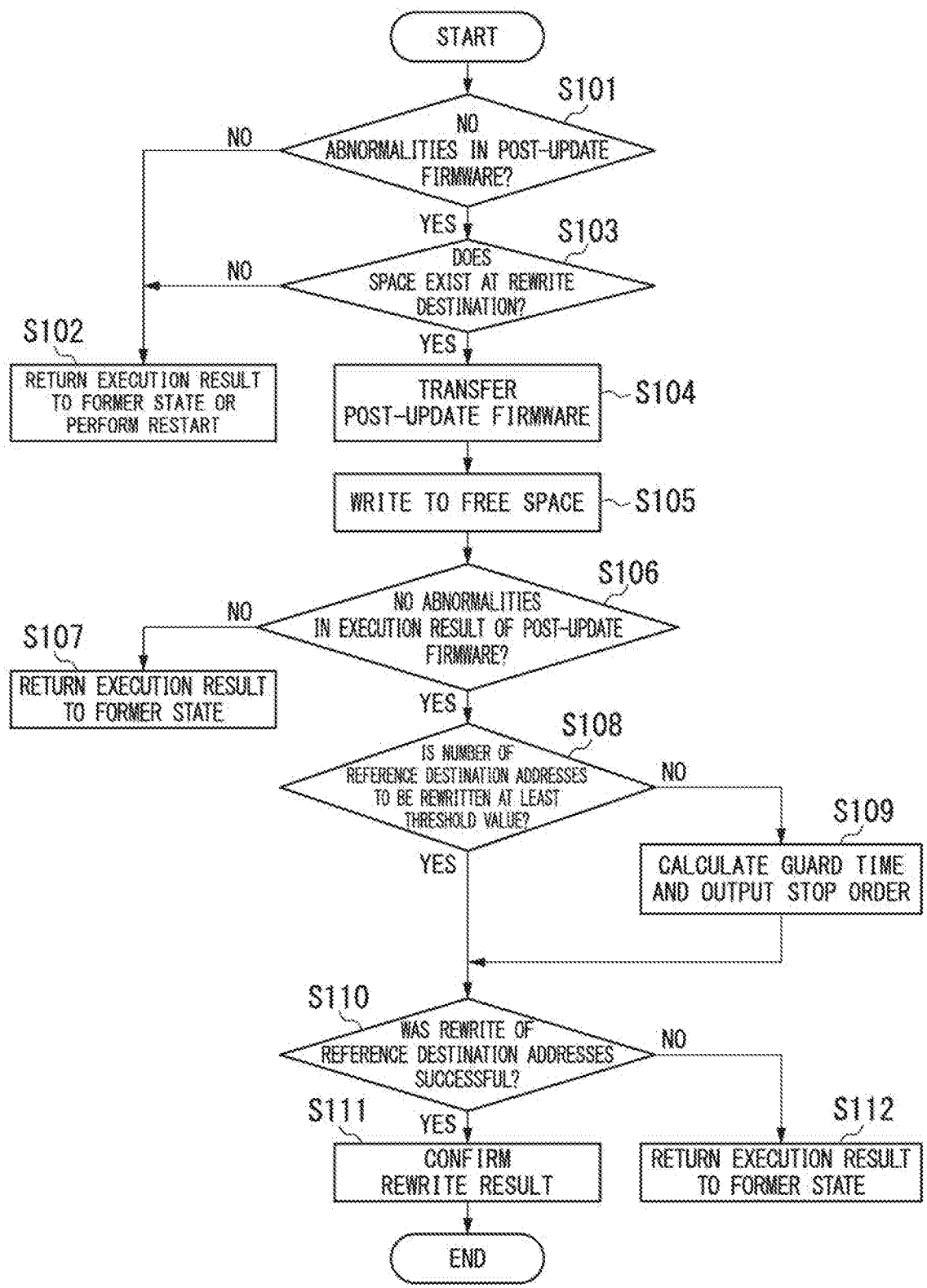
FIG. 3 is a flowchart showing an example of the operation of an optical access system according to the first exemplary embodiment.

FIG. 3 is a flowchart showing an example of the operation of an optical access system according to the first exemplary embodiment.

A restart sometimes becomes necessary when an abnormality occurs in the optical access device 2 and causes an abnormal stop. The optical access device 2 deploys the pre-update firmware 200 stored in the ROM 20 to the memory 22 and executes the pre-update firmware 200. The optical access device 2 writes the post-update firmware 222 to the memory 22. The optical access device 2 confirms the integrity of the post-update firmware 222 written to the memory 22.

(Step S101) Using the same optical access device as the optical access device 2 to which the post-update firmware 222 is written, verification is performed to determine whether or not an abnormality exists in the post-update firmware 222. If the post-update firmware 222 is determined to have an abnormality, the flow proceeds to step S102. On the other hand, if the post-update firmware 222 is determined not to have an abnormality, the flow proceeds to step S103.

(Step S102) If the post-update firmware is determined to have an abnormality, processing is performed that returns the execution result of the post-update firmware to a former state, restarts the optical access device, and the like.

(Step S103) If the post-update firmware is determined to not have an abnormality, the writing device 3 is connected to the optical access device 2. The writing device 3 outputs a write request to the optical access device 2. The writing unit 25 of the optical access device 2 determines, in response to the write request output by the writing device 3, whether or not space is available for writing the post-update firmware 222 to the memory 22. If the writing unit 25 determines that space is not available for writing the post-update firmware 222, the flow proceeds to step S102. If the writing unit 25 determines that space is available, the flow proceeds to step S104.

The pre-update firmware becomes damaged if the pre-update firmware that is being executed is overwritten with the post-update firmware. Consequently, the optical access device 2 can sometimes become stopped. In order to prevent damage to the pre-update firmware, it is necessary to confirm that the size of the free space is sufficient prior to writing the post-update firmware.

For example, the writing unit 25 refers to a memory map which is output when the post-update firmware 222 is compiled to acquire the size of the post-update firmware 222. The writing unit 25 may also dump the memory information of the pre-update firmware 221 to acquire the size of the pre-update firmware 221.

(Step S104) The writing device 3 transfers the post-update firmware 222 to the optical access device 2.

(Step S105) The writing unit 25 of the optical access device 2 writes the post-update firmware 222 transferred by the writing device 3, to the memory 22. Here, if a program being executed has become rewritten despite the writing unit 25 having determined that space is available for writing the post-update firmware 222, the execution result is returned to a former state, or the optical access device 2 is forcibly restarted. The firmware may be updated by a method equivalent to a conventional firmware update after the optical access device 2 has been restarted.

(Step S106) The CPU 23 executes the post-update firmware 222 written to the memory 22 by the writing unit 25, and determines whether or not the firmware has been correctly written. The writing unit 25 nay perform the determination by confirming whether or not the post-update firmware 222 transferred to the optical access device 2 matches the data of the post-update firmware 222 deployed to the memory 22.

If the CPU 23 determines that the firmware has been correctly written, it additionally determines whether or not there is an abnormality with the execution result. If the firmware has not been correctly written and/or an abnormality exists in the execution result, the flow proceeds to step S107. If the firmware has been correctly written and no abnormality exists in the execution result, the flow proceeds to step S108.

(Step S107) If the firmware has not been correctly written and/or an abnormality exists with the execution result. the CPU 23 returns the execution result to a former state.

(Step S108) If the firmware has been correctly written and no abnormality exists in the execution result, the rewriting unit 27 of the optical access device 2 may perform the following determination. The rewriting unit 27 determines whether or not the number of reference destination addresses associated with the reference destinations 223 recorded in the indirect reference table 224 that are to be rewritten at least a threshold value. If the number of reference destination addresses to be rewritten is at least the threshold value, the flow proceeds to step S109. If the number of reference destination addresses to be rewritten is less than the threshold value, the flow proceeds to step S110. The determination processing of step S108 may be omitted. In this case, the rewriting unit 27 proceeds to step S110.

Here, if the number of reference destination addresses to be rewritten is one, it assumed that there is a low likelihood of a problem occurring even if the reference destination addresses associated with the reference destinations 223 of the pre-update firmware 221 inside the indirect reference table 224 are rewritten with new reference destination addresses associated with the new reference destinations 225 of the post-update firmware 222. However, if the number of reference destination addresses to be rewritten is more than one, there is a concern that mixing of the reference destinations 223 and the new reference destinations 225 may occur between the pre-update firmware 221 and the post-update firmware 222. In particular, depending on the reference destinations 223 that are associated with the reference destination address to be rewritten, it is anticipated that the update duration will become at least a function restriction duration. Consequently, when the rewrite process is executed, the optical access device 2 temporarily stops all processes other than the rewrite process, including those programs currently being executed, in order to prevent interruption by other processes.

(Step S109) If the number of reference destination addresses to be rewritten is greater than or equal to a threshold value, the stop processing unit 28 of the optical access device 2 calculates a guard time on the basis of the number of reference destination addresses to be rewritten. The stop processing unit 28 outputs to the platform firmware 220 and the like, a stop command that stops all processing other than the rewrite processing for the duration of the guard time obtained from the calculation.

The stop processing unit 28 may also output to the platform firmware 220 and the like, a control instruction that assigns the highest priority to the rewrite processing. For example, the stop processing unit 28 uses a system call to output a stop command and a priority control instruction to the platform firmware 220 and the like. The CPU 23 stops all processing other than the rewrite processing for the duration of the guard time according to the stop command output by the stop processing unit 28. After the CPU 23 has stopped all processing other than the rewrite processing, the flow proceeds to step S110.

(Step S110) The rewriting unit 27 of the optical access device 2 rewrites the reference destination addresses stored in association with the reference destination 223 stored in the indirect reference table 224, with new reference destination addresses. Specifically, the rewriting unit 27 confirms the reference destination addresses of the function pointers associated with the reference destinations 223 of the update target functions included in the pre-update firmware 221. Then, the rewriting unit 27 rewrites the reference destination addresses with new reference destination addresses of the new reference destinations 225 of the update target functions included in the post-update firmware 222. As a result, an update to the firmware can be precisely executed free from abnormalities.

Here, if a program being executed becomes rewritten by the writing unit 25, processing is performed that returns the execution result to a former state or forcibly restarts the optical access device 2. The update processing of the firmware may be performed again after the optical access device 2 is restarted.

The rewriting unit 27 determines whether or not the rewrite was successful. If the rewrite is determined to have been successful, the flow proceeds to step S111. If the rewrite is determined to have failed, the flow proceeds to step S112.

(Step S111) If the rewrite is determined to have been successful, the rewriting unit 27 of the optical access device 2 confirms the result of the rewrite. Specifically, the rewriting unit 27 confirms whether or not to proceed to the processing of the post-update firmware 222 by confirming whether or not the new reference destination addresses that have been rewritten are correct. If the rewriting unit 27 determines to proceed to the processing of the post-update firmware 222 through an absence of abnormalities or errors, the update sequence is terminated.

(Step S112) If the rewrite is determined to have failed, the rewriting unit 27 of the optical access device 2 returns the execution result to a former state. If the rewrite fails and the operation of the optical access device 2 has stopped, the optical access device 2 may be restarted. Also in cases where the operation of the optical access device 2 has stopped, the execution result is returned to a former state. Examples of cases where the operation has stopped include a case where processing has stopped for a predetermined, duration (msec) and a case where there is no response to a timer such as a watchdog timer.

The embodiment above has been described for a case where the post-update firmware 222 is not stored in the ROM 20, however it is not limited to such an example. For example, the post-update firmware 222 may be stored in the ROM 20. In this case, the post-update firmware 222 stored in the ROM 20 is written to the free space of the memory 22.

Furthermore, in the embodiment described above, the indirect reference table 224 may be included in the pre-update firmware 221.

The embodiment above was described for a case where the writing unit 25 writes the post-update firmware 222 to the free space of the memory 22 based on a write request output by the writing device 3, however it is not limited to such an example. For example, the writing unit 25 may write the entire post-update firmware 222, or may write a difference data between the pre-update firmware 221 and the post-update firmware 222.

The embodiment above was described for a case where the stop processing unit 28 sets a guard time based on the number of reference destination addresses to be rewritten, however it is not limited to such an example. For example, the stop processing unit 28 may set the guard time based on a restriction duration of the functions that are restricted as a result of rewriting the reference destination addresses. Furthermore, the stop processing unit 28 may set a plurality of guard times if the set guard time is longer than the restriction duration of the functions that are restricted as a result of rewriting the reference destination addresses.

In this manner, the rewriting unit 27 determines whether or not at least either the number of reference destination addresses targeted for rewriting or the restriction duration of the functions that are restricted as a result of the rewriting processing is at least a threshold value. If the stop processing unit 28 determines that at least either the number of addresses to be rewritten or the restriction duration is at least the threshold value, it sets the guard time on the basis of either the number of addresses to rewritten or the restriction time.

According to at least one embodiment described above, the optical access device 2 includes a memory 22, a rewriting unit 27, and a CPU 23. The memory 22 stores the reference destinations 223, which is data relating to the pre-update firmware 221, in association with the reference destination addresses, which are the storage areas of the reference destinations. Among the reference destination addresses stored in the memory 22, the rewriting unit 27 rewrites at least some of the reference destination addresses with new reference destination addresses indicating the storage areas of the reference destinations 225, which is data relating to the post-update firmware 222. The CPU 23 refers to the new reference destinations 225 on the basis of the rewritten new reference destination addresses.

As a result of such a configuration, when updating the firmware of the optical access device 2, it is possible to prevent the service interruptions of the network and to update the firmware while continuing the service being provided.

Furthermore, according to at least one embodiment, a writing unit is further provided. The writing unit writes the post-update firmware 222 in a free storage area when a free storage area is available for writing the post-update firmware 222. As a result of such a configuration, abnormalities that occur as a result of a program being overwritten during execution can be prevented. Even if an abnormality occurs as a result of rewriting a program during execution, services can be rapidly restarted by returning the execution result to a former state or by forcibly restarting the optical access device 2, Furthermore, according to at least one embodiment, the rewriting unit 27 determines whether or not the number of reference destination addresses to be rewritten is at least a threshold value. The optical access device 2 includes a stop processing unit that sets a guard time that stops all processing other than the rewrite processing in a case where the number of reference destination addresses to be rewritten is determined to be at least a threshold value. The CPU 23 stops all processing other than the rewrite processing which rewrites the reference destination addresses with new reference destination addresses, according to the guard time set by the stop processing unit.

As a result of such a configuration, phenomena that are of concern when the number of reference destination addresses targeted for updating becomes large can be suppressed. That is to say, a phenomenon in which mixing of the reference destinations 223 and the new reference destinations 225 occurs between the pre-update firmware 221 and the post-update firmware 222 can be suppressed.

Moreover, according to at least one embodiment, the stop processing unit 28 sets a guard time on the basis of the number of reference destination addresses and/or the restriction duration of the functions that are restricted as a result of rewriting the reference destination addresses. As a result of such a configuration, the guard time during which all processing other than the rewrite processing is stopped can be set.

(Second Embodiment)

A text area and a data area are held in the memory 22 for the pre-update firmware 221 and the post-update firmware 222, respectively. The data area stores variable values. The post-update firmware 222 is unable to refer to the variable values held in the data area of the pre-update firmware 221. In this manner, if the variable values or state takeover before and after the firmware update are not considered, the variable values and the state are reinitialized after the firmware update. As a result, it is necessary to recalculate the variable values and to reacquire the state after the firmware update.

For example, with respect to the registration and authentication information of an ONU, which is a subscriber-side device, or an OLT, if a state of calculation of a DBA (Dynamic Bandwidth Allocation) that controls the upstream communication band of the ONU is not taken over before and after the update, a communication delay, a reconnection, or a re-registration of the authentication information becomes necessary.

In a second exemplary embodiment, takeover processing of the variable values before and after the firmware update will be described. That is to say, in the second exemplary embodiment, a technique will be described that enables continued use of the variable values and states before and after a firmware update without a service interruption. The second exemplary embodiment will be described in detail with reference to the drawings.

Figure 4:
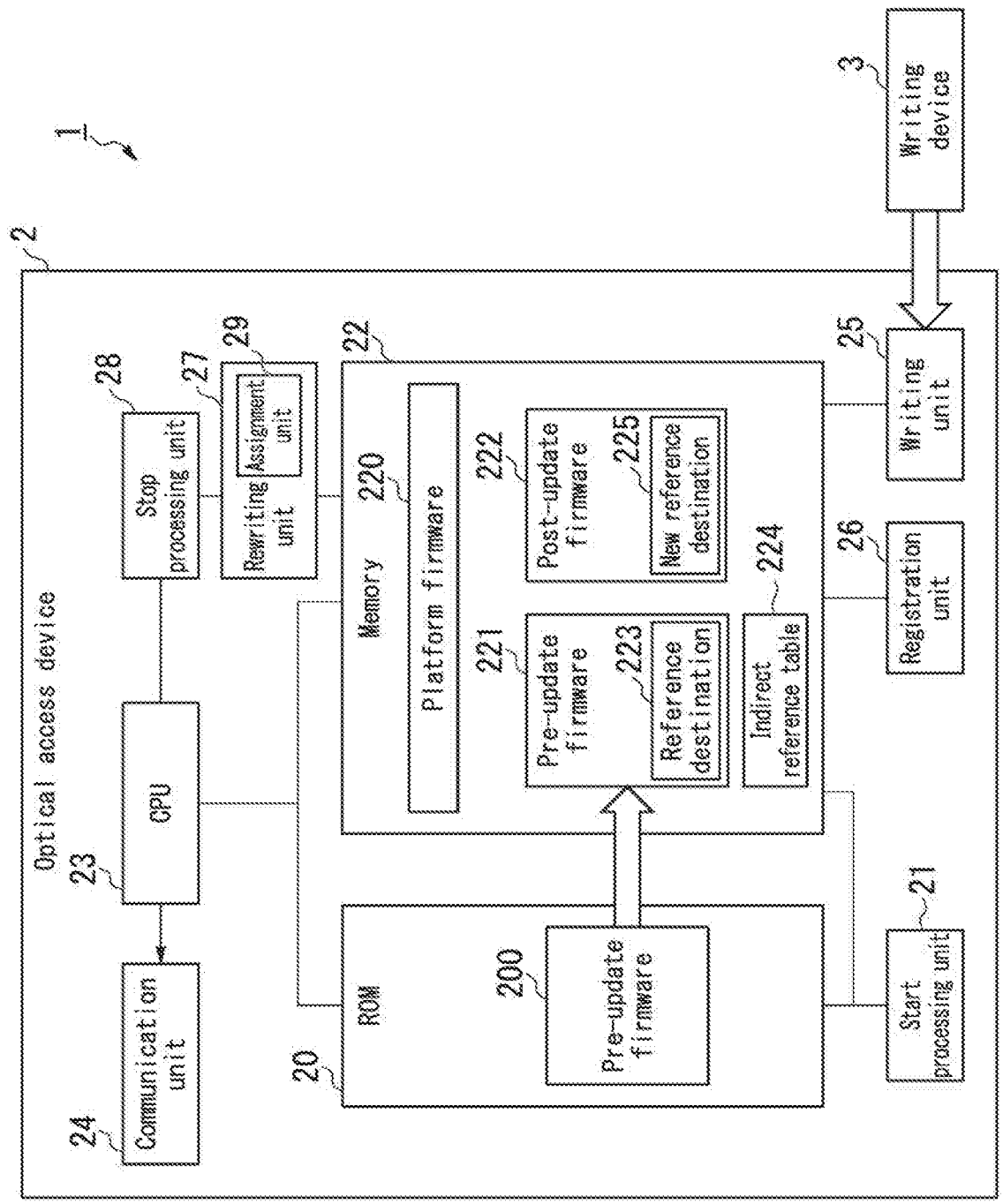
FIG. 4 is a configuration diagram showing an example of the configuration of an optical access device according to a second exemplary embodiment.

FIG. 4 is a configuration diagram showing an example of the configuration of an optical access device 2 in the second exemplary embodiment.

As described in the first exemplary embodiment, the rewriting unit 27 rewrites the reference destination addresses stored in association with the reference destinations 223 stored in the indirect reference table 224, with new reference destination addresses. In contrast to the first exemplary embodiment, the rewriting unit 27 in the second exemplary embodiment additionally includes an assignment unit 29.

The assignment unit 29 assigns the variable addresses included in the pre-update firmware 221, to pointer variables that hold the variable addresses included in the post-update firmware 222. That is to say, the assignment unit 29 performs assignments by writing the variable addresses included in the pre-update firmware 221, to specified locations of the post-update firmware 222 in the memory 22. For other variables, the assignment unit 29 writes the addresses included in the post-update firmware 222. Specifically, for example, the assignment unit 29 performs assignments by calling a system call provided in the operating system to write addresses.

This is described in detail below. The pre-update firmware 221 is a program constituted by a text area and a data area. The text area stores function data which is executed in the optical access device 2. The function data realizes a processing sequence that enables optical communications to be performed by the optical access device 2. The function data of the functions respectively realize different processing. The data area stores variable values which are referred to by the function data. Specifically, the function data references addresses (start addresses) indicating the storage areas of the variable values. The function data acquires the variable values inside the data area by referring to the start addresses. The pre-update firmware 221 is one form of first data which represents a pre-update firmware.

The post-update firmware 222 is a program constituted by a text area and a data area. The text area stores function data which is executed in the optical access device 2. The data area stores variable values which are referred to by the function data. Specifically, the function data references addresses (start addresses) indicating the storage areas of the variable values. The function data refers to the variable values inside the data area by referring to the start addresses. The post-update firmware 222 is one form of second data which represents a pre-update firmware.

If the post-update firmware 222 is only stored in the memory 22, the CPU 23 is unable to refer to the data area of the pre-update firmware 221 from the post-update firmware 222. In order for the CPU 23 to be capable of referring to the variable values inside the data area of the pre-update firmware 221 when the function data of the post-update firmware 222 is executed according to an operation, the variable address is required to be rewritten. That is to say, the addresses referred to by the function data of the post-update firmware 222 must be rewritten such that the addresses point to the data area of the pre-update firmware 221. This type of referencing, in which the CPU 23 refers to the data area of the pre-update firmware 221 when executing the function data of the post-update firmware 222, is referred to as indirect referencing.

As described in the first exemplary embodiment, the memory 22 includes an indirect reference table 224. The indirect reference table 224 represents data in a table format that associates the function data and variable values with the start addresses of the storage areas that store the function data and variable values and the like. Hereunder, of the information included in the indirect reference table 224, a table that associates variables with the start addresses of the storage areas that store the variable values is referred to as a variable table.

As a result of rewriting the indirect reference table 224, the reference destination addresses (start addresses and the like) inside the text area and the data area can be switched between the storage area addresses in the pre-update firmware 221 and the storage area addresses in the post-update firmware 222, The rewriting unit 27 may, for example, be provided in the CPU 23 as a peripheral circuit of the core of the CPU 23.

As described in the first exemplary embodiment, the CPU 23 refers to function data using indirect referencing inside the pre-update firmware 221. At this time, for example, the addresses of the reference destinations of the function data are rewritten with the start addresses of the functions inside the post-update firmware 222 rather than the functions inside the pre-update firmware 221. As a result, the CPU 23 executes the functions inside the post-update firmware 222. A firmware update is realized by rewriting the indirect reference destinations in this manner.

In the second exemplary embodiment, the assignment unit 29 assigns the start addresses indicating the storage areas of the variables of the pre-update firmware 221, to the start addresses representing the storage areas of the variables of the post-update firmware 222 inside the variable table. As a result, the variable addresses referred to by the CPU 23 are rewritten between storage area addresses of the pre-update firmware 221 and storage areas addresses of the post-update firmware 222.

The CPU 23 refers to the variable table of the post-update firmware 222 when executing the post-update firmware 222. The CPU 23 refers to the variable values stored in the data area of the pre-update firmware 221 indicated by the reference destination addresses held in the variable table. As a result, the CPU 23 is capable of continuing the use of variables used in the pre-update firmware 221 as is, from programs executed by the post-update firmware 222.

Figure 5:
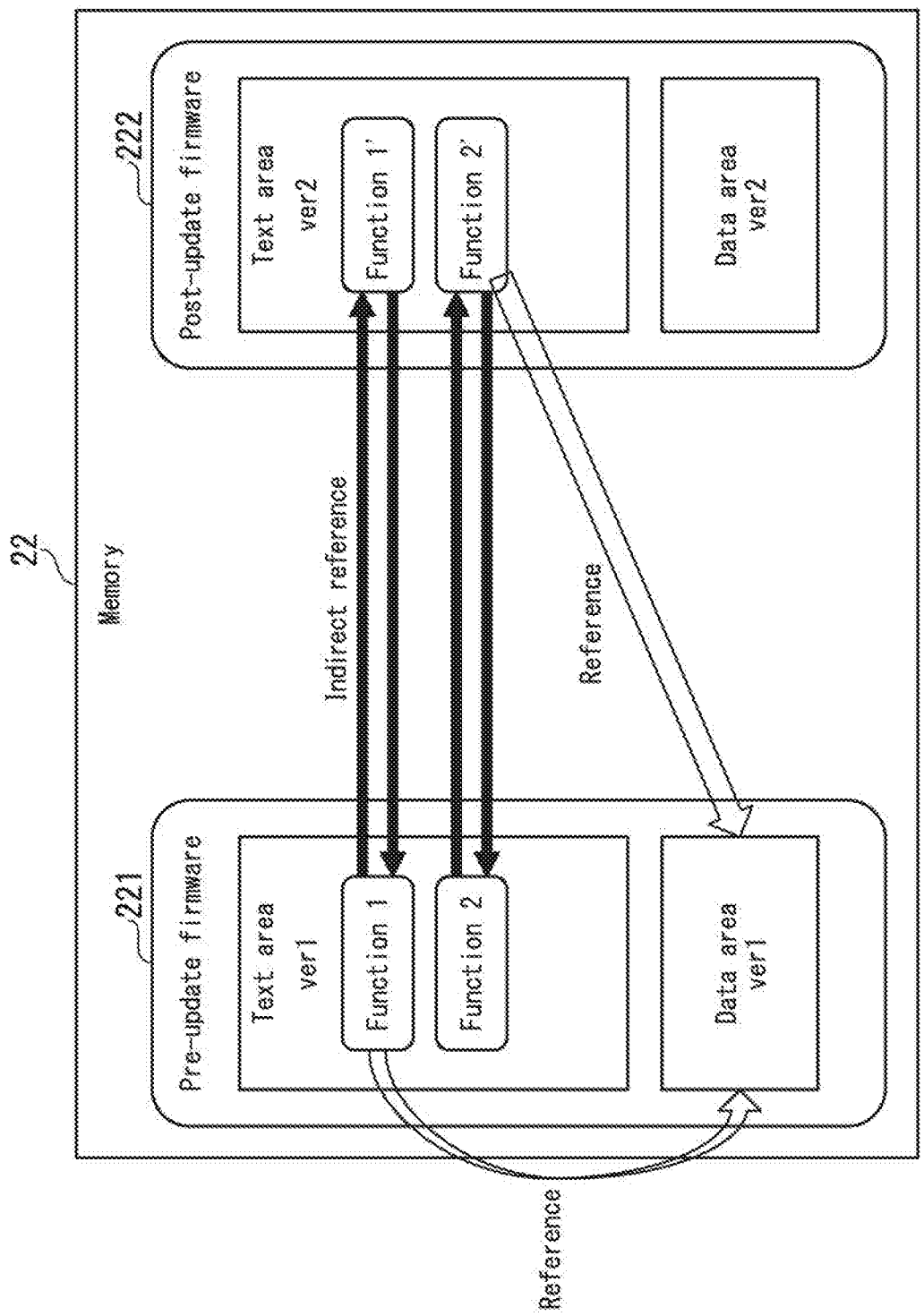
FIG. 5 is a schematic diagram showing a case where a data area of a pre-update firmware is indirectly referenced from a post-update firmware according to the second exemplary embodiment.

FIG. 5 is a schematic diagram showing a case where a data area of a pre-update firmware is indirectly referenced from a post-update firmware according to the second exemplary embodiment. As shown in the same diagram, the memory 22 stores the pre-update firmware 221 and the post-update firmware 222. The pre-update firmware 221 holds a text area ver1 and a data area ver1 in a storage area inside the memory 22. The text area ver1 holds a plurality of function data. Variable values is referred to from the data area ver1 by the function data according to an operation of the CPU 23.

The post-update firmware 222 holds a text area ver2 and a data area ver2 in a storage area inside the memory 22. The text area ver2 holds a plurality of function data. The text area ver2 holds a plurality of function data. If the function data in the text area ver2 of the post-update firmware 222 is stored in the memory 22, the variable table is rewritten by the assignment unit 29 such that the start addresses in the data area ver1 of the pre-update firmware 221 are referred to. Therefore, the function data of the post-update firmware 222 refers to the data area ver1 of the pre-update firmware 221. As a result, continued use of the variable values being used in the pre-update firmware 221 becomes possible.

Figure 6:
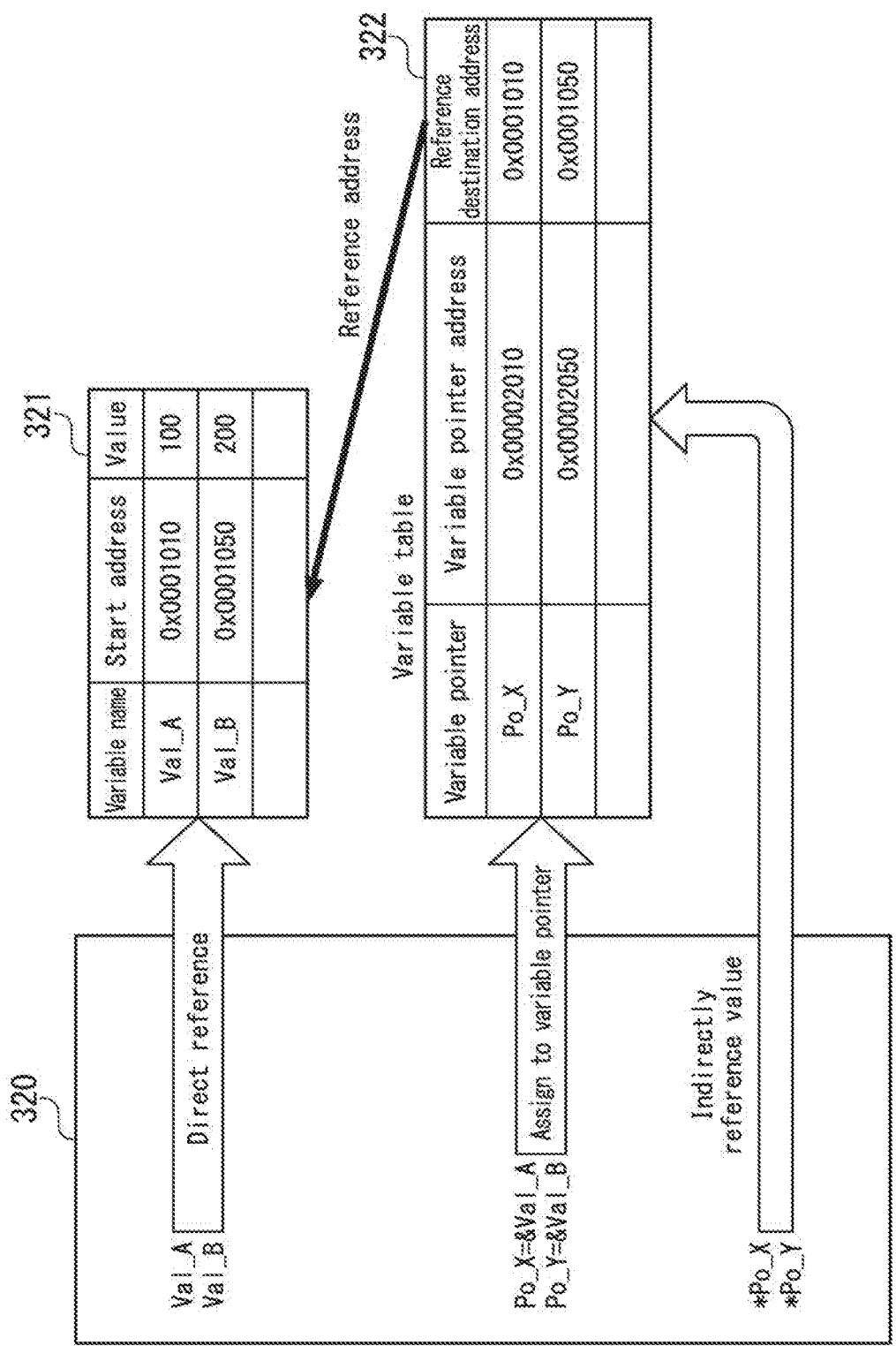
FIG. 6 is a schematic diagram relating to the referring to variable values by a pre-update firmware according to the second exemplary embodiment.

FIG. 6 is a schematic diagram relating to the referring to variable values by a pre-update firmware according to the second exemplary embodiment. The program 320 is one example of program code in the pre-update firmware 221. The two variables Val_A and Val_B are defined as variables in the program 320. According to the table 321, the start address of Val_A is "0x0001010", and the value is "100". The start address of Val_B is "0x0001050", and the value is "200". The CPU 23 executes the pre-update firmware 221, and can refer to the variable values by directly referencing the two variables.

In the program 320, the two variables Po_X and Po_Y are defined as variable pointers. In the second exemplary embodiment, a variable pointer holds the start address of a variable assigned by the assignment unit 29 as a reference destination address. Variable pointers are variables used in the C programming language and the like that store variable addresses. In the program 320, the start address of the variable Val_A is assigned to Po_X. The start address of the variable Val_B is assigned to Po_Y. The defined variable pointers are held in the variable table 322.

The variable table 322 includes a variable pointer record for each variable pointer. A variable pointer record includes name for the variable pointer, the variable pointer address, and the reference destination address. The name for the variable pointer refers to the variable name defined in the program 320. The variable pointer address refers to the start address in the data area in which the variable pointer is stored. The reference destination address is the value held by the variable pointer, and refers to the start address in the data area in which the takeover target variable is stored.

In the example illustrated by the variable table 322, the uppermost record in the variable table 322 has the variable pointer value "Po_X", while the start address value at which the variable pointer is held is "0x0002010" and the reference destination address value is "0x0001010". Therefore, according to the uppermost record in the variable table 322, the variable pointer defined by the program 320 is "Po_X", and the variable pointer is stored at an address of "0x0002010" in the data area. The variable pointer holds a value of "0x0001010" as the reference destination address.

In the program 320, the values of the pointer variables are indirectly referenced as a result of executing the processing of "*Po_X"and "Po_Y". Specifically, when "*Po_X" is executed, the address held by the variable pointer Po_X held in the variable table 322 is referred to. The address held by the variable pointer holds the value "0x0001010" as the reference destination address, Therefore, "100" being the value of the variable Val_A held at the reference destination address "0x0001010" is referred to.

Figure 7:
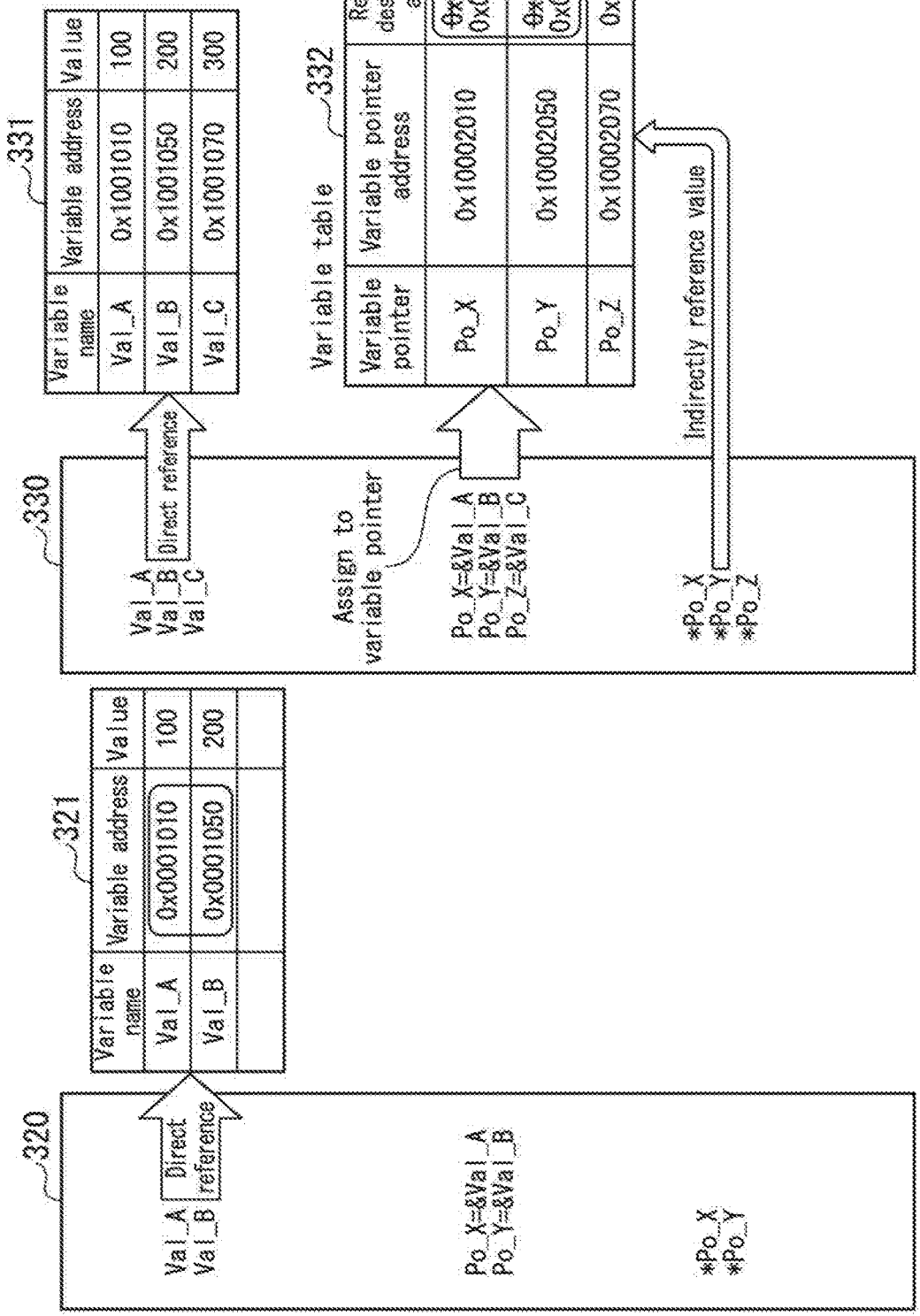
FIG. 7 is a schematic diagram relating to the indirect referencing of variable values by a post-update firmware according to the second exemplary embodiment.

FIG. 7 is a schematic diagram relating to the indirect referencing of variable values by a post-update firmware according to the second exemplary embodiment. The program 320 is one example of program code in the pre-update firmware 221. The variables defined by the pre-update firmware 221 are, as indicated in the table 321, stored in a state where the variable value and the start address inside the data area of the pre-update firmware 221 are tied together.

The program 330 is one example of program code in the post-update firmware 222. The three variables Val_A, Val_B, and Val_C are defined as variables in the program 330. According to the table 331, the start address of variable Val_A is "0x1001010", and the value of variable Val_A is "100". The start address of variable Val_B is "0x1001050", and the value of variable Val_B is "200". The start address of variable Val_C is "0x1001070", and the value of variable Val_C is "300".

In the program 330, the three pointer variables Po_X, Po_Y, and Po Z are defined as variable pointers. A variable pointer is a variable that holds the start address of a variable as a reference destination address. In the program 330, the pointer variable Po_X is assigned the start address of the variable Val_A. The pointer variable Po_Y is assigned the start address of the variable Val_B. The pointer variable Po_Z is assigned the start address of variable Val_C. The defined variable pointers are held in the variable table 332.

Examples of variables held in the variable table 332 include variables used in DBA (Dynamic Bandwidth Allocation) calculation algorithms, variables that hold authentication information of an ONU registered in an OLT, and variables that hold VLAN (Virtual Local Area Network) setting information. Furthermore, examples of variables held in the variable table 332 include variables that hold maximum values and maximum values of the communication band assigned to an OLT.

When the post-update firmware 222 has been written to the memory 22, the reference destination address of each variable pointer in the variable table 332 represents the variable start address in the post-update firmware 222. That is to say, the reference destination address of each variable pointer points to the data area of the post-update firmware 222. Specifically, according to the uppermost record in the variable table 332, the value of the address of the variable pointer Po_X is "0X10002010", and the value of the reference destination address is "0x4001010". Therefore, in order to refer to the data area in the pre-update firmware 221 from the post-update firmware 222, it is necessary to store addresses representing the data area of the pre-update firmware 221 as the reference destinations of the variable pointers, which is used by the post-update firmware 222, inside the variable table 332.

The method for storing the addresses representing the data area of the pre-update firmware 221 in the variable table 332 is described in detail using the variable Val_A. The assignment unit 29 of the rewriting unit 27 specifies the variable names used in the pre-update firmware 221 and the post-update firmware 222. Val_A is a variable name used in both the pre-update firmware 221 and the post-update firmware 222. The assignment unit 202 acquires the start address of the variable Val_A of "0x0001010" stored in the pre-update firmware 221. According to the program 330, the start address of the variable Val_A of "0x1001010" is assigned to the variable pointer Po_X. The assignment unit 202 acquires the variable pointer record relating to the variable pointer Po_X from the variable table 332. The assignment unit 202 assigns the variable start address of "0x0001010" recorded in the pre-update firmware 221 as the value of the reference destination address of the acquired variable pointer record.

In the program 330, the value of variable Val_A is indirectly referenced by "*Po_X". Specifically, when "*Po_X" is executed, the variable pointer address relating to the variable pointer Po_X held in the variable table 332 is referred to. The value of "0x0001010" indicating the data area of the pre-update firmware 221 is held at the variable pointer address as the reference destination address. Therefore, the value "100" at the reference destination address "0X0001010" of the pre-update firmware 221 can be referred to from the post-update firmware 222 by indirect referencing.

The assignment unit 29 of the rewriting unit 27 assigns the start addresses of the pre-update firmware 221 to the reference destination addresses in the variable table 332 for those variables used in both the pre-update firmware 221 and the post-update firmware 222. Furthermore, as described in the first exemplary embodiment, the rewriting unit 27 rewrites the addresses of the functions of the pre-update firmware 221 in the indirect reference table 224 with addresses representing the post-update firmware 222.

Figure 8:
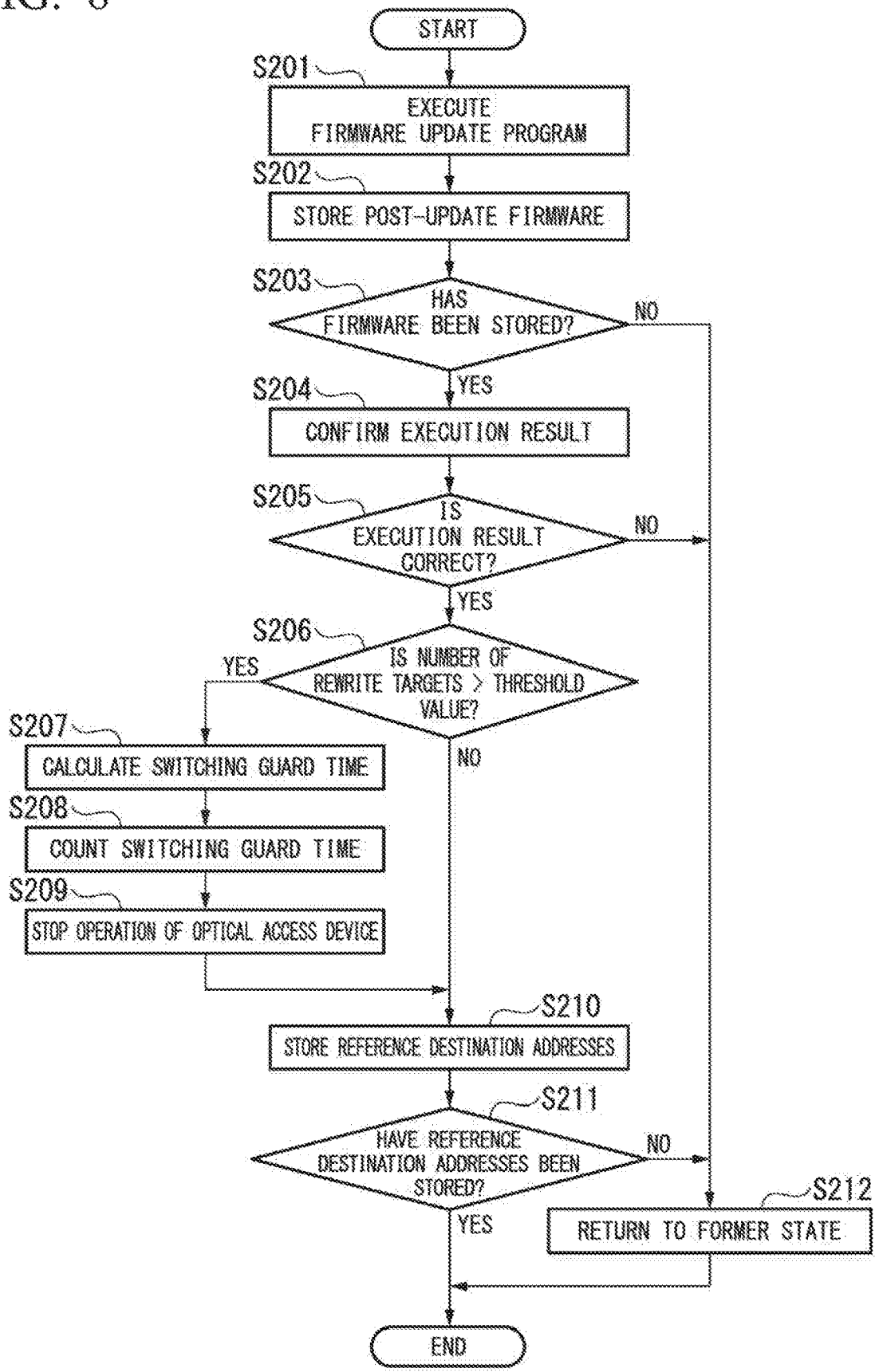
FIG. 8 is a flowchart showing a firmware update sequence according to the second exemplary embodiment.

FIG. 8 is a flowchart showing a firmware update sequence according to the second exemplary embodiment. At the time of the firmware update, as a prior confirmation the user may perform a prior confirmation of the post-update firmware 222 written to the ROM 20, and a prior confirmation of the memory 22. A prior confirmation requires a verification performed beforehand using the same optical access device as the optical access device 2.

The CPU 23 executes a firmware update program stored in the ROM 20 (step S201). In the present embodiment, because a restart of the optical access device 2 is not performed, the programs currently being operated in the pre-update firmware 221 are not rewritten. When the CPU 23 executes the firmware update program, the rewriting unit 27 stores the post-update firmware 222 in the memory 22 (step S202).

The CPU 23 determines whether or not the post-update firmware 222 has been correctly stored in the memory 22 (step S203). Specifically, the CPU 23 may determine that the post-update firmware 222 has been correctly stored if the address ranges secured beforehand for other programs have not been violated as a result of storing the post-update firmware 222. Alternatively, the CPU 23 may determine that the post-update firmware 222 has been correctly stored if a signal is received from the rewriting unit 27 indicating that the storage of the post-update firmware 222 was correctly completed. The other programs may include the platform firmware 220 and the pre-update firmware 221 and the like.

If the post-update firmware 222 is not correctly stored in the memory 22 (step S203:NO), the flow proceeds to step S212. If the post-update firmware 222 is correctly stored in the memory 22 (step S203:YES), the CPU 23 confirms the execution result (step S204). The CPU 23 determines whether or not the execution result is correct (step S205). If the execution result is not correct (step S205:NO), the flow proceeds to step S212.

If the execution result is correct (step S205: YES), the CPU 23 may determine whether or not the number of functions or variables targeted for rewriting is greater than a threshold value (step S206), The functions targeted for rewriting may represent functions which are executed by the CPU 23. The variables targeted for rewriting may, for example, include those variables that are used in both the pre-update firmware 221 and the post-update firmware 222. If the number of functions or variables is smaller than the threshold value (step S206:NO), the CPU 23 proceeds to step S210. The determination processing of step S206 may be omitted. In this case, the CPU 23 proceeds to step S210.

If the number of functions or variables is greater than the threshold value (step S206:YES), the CPU 23 calculates a switching guard time (step S207). The switching guard time refers to the duration in which all operations of the optical access device 2 other than the processing that rewrites the addresses are stopped such that abnormalities in the optical access device 2 do not occur when the addresses are rewritten. The CPU 23 starts counting the switching guard time (step S208). The CPU 23 stops all operations of the optical access device 2 other than the processing that rewrites the addresses (step S209).

With respect to the functions targeted for switching, the CPU 23 rewrites the reference destination addresses of the pre-update firmware 221 stored in the indirect reference table 224 with the reference destination addresses of the post-update firmware 222. Furthermore, with respect to the variables referred to in the functions targeted for switching, the CPU 23 stores the variable start addresses of the pre-update firmware 221 as the reference destination addresses of the post-update firmware 222 (step S210). The CPU 23 determines whether or not the reference destination addresses have been correctly stored (step S211). If the addresses have been correctly stored (step S211: YES), the processing terminates. If the addresses were not correctly stored (step S211:NO), the CPU 23 returns the optical access device 2 to the state before the post-update firmware 222 was stored by deleting the post-update firmware 222 from the memory 22 (step S212). The CPU 23 may also restart the optical access device 2.

As described above, the rewriting unit 27 rewrites the values of the pointer variables, which are stored in an area different from the storage area of the pre-update firmware 221 and hold reference destination addresses representing at least some of the target variables among the variables included in the post-update firmware 222, with the reference destination addresses (first variable reference destination addresses) that represent the storage areas of the target variables in the pre-update firmware 221. Furthermore, the CPU 23 refers to the values of the target variables on the basis of the reference destination addresses held by the pointer variables.

An optical access device 2 configured in such a manner stores the pre-update firmware 221 and the post-update firmware 222 in the memory 22. The CPU 23 refers to the data area of the pre-update firmware 221 via the post-update firmware 222. Therefore, the variable values being used prior to the firmware update can continue to be used by the programs that are executed in the text area of the post-update firmware. That is to say, the variable values and states can be continuously used before and after the firmware update.

As a result, takeover of the authentication information of an ONU and the state of value calculations becomes possible, which realizes a firmware update method without a service disconnection, that does not adversely impact service quality. Further, by referring to the data area of the pre-update firmware 221 inside the memory 22 from the post-update firmware 222, it becomes possible to prevent initialization of the optical access device 2 after the firmware update with respect to the authentication information of the ONU, the state of value calculations, and the like.

Moreover, the CPU 23 or the assignment unit 29 may copy the variable values and the function data and the like used in the pre-update firmware 221 to the storage area of the variable values used in the post-update firmware 222. Consequently, the CPU 23 or the assignment unit 29 are capable of increasing the free space in the memory 22 in those cases where the pre-update firmware 221 is no longer used.

If takeover of the variable values used in the pre-update firmware 221 to the variable values used in the post-update firmware 222 is to be performed, a shared storage area (referred to as "shared area" below) used by both the pre-update firmware 221 and the post-update firmware 222 may be defined in the memory 22. Consequently, even in those cases where the variable table stores the storage areas of the post-update firmware 222, the CPU 23 is capable of acquiring the variable values used in the pre-update firmware 221 from the shared area. That is to say, even during a period in which the CPU 23 is executing operations based on the post-update firmware 222, the CPU 23 is capable of takeover of the variable values used in the pre-update firmware 221 by referring to the shared area.

(Modification 1)

The data area of the post-update firmware 222 may be used when a new variable is added to the post-update firmware 222. For example, in FIG. 7, the variable Val_C is added as a new variable. The variable Val_C is referred to from a function inside the post-update firmware 222. The new variable Val _C has a start address of "0x1001070". In FIG. 7, the variable pointer Po_Z holds the reference destination address of the variable Val_C. According to the variable table 332, the variable pointer Po Z stores "0x1001070" as the reference destination address, which represents the data area of the post-update firmware 222. Therefore, even if the variable values are held in the data area inside the post-update firmware 222, the optical access device 2 is capable of performing optical communication without adversely affecting the calculations inside the post-update firmware 222.

(Modification 2)

If the update processing according to the first and second exemplary embodiments is executed a plurality of times, the memory 22 stores a plurality of different post-update firmware 222. Specifically, the memory 22 sometimes stores a post-update firmware 222a in addition to the post-update firmware 222. If the post-update firmware 222a is also stored, the CPU 23 executes on the basis of the state of the pre-update firmware 221, the functions stored in the newly added post-update firmware 222a from the corresponding the post-update firmware 222.

Specifically, the rewriting unit 27 rewrites the reference destinations of the functions of the pre-update firmware 221 with new reference destinations in the post-update firmware 222 or in the newly added post-update firmware 222a. Alternatively, the rewriting unit 27 rewrites the reference destinations of the functions of the post-update firmware 222 with new reference destinations in the newly added post-update firmware 222a.

In this manner, the rewriting unit 27 performs the following processing when the post-update firmware 222a is additionally stored. That is to say, the rewriting unit 27 rewrites at least some of the reference destination addresses (first reference destination addresses) of the target functions in the pre-update firmware 221 with new reference destination addresses (second reference destination addresses) in the post-update firmware 222 or with new reference destination addresses (third reference destination addresses) in the post-update firmware 222a. Alternatively, the rewriting unit 27 rewrites at least some of the reference destination addresses (second reference destination addresses) in the post-update firmware 222 with new reference destination addresses (third reference destination addresses) in the post-update firmware 222a Furthermore, the assignment unit 29 assigns the variable addresses of the pre-update firmware 221 or the post-update firmware 222 to the variable pointers of newly added post-update firmware 222a.

In this manner, the rewriting unit 27 performs the following processing when the post-update firmware 222a is additionally stored. That is to say, the rewriting unit 27 rewrites at least some of the values of the pointer variables, which are stored in areas different from the storage areas of the pre-update firmware 221 and the post-update firmware 222 and hold reference destination addresses indicating the storage areas of the target variables. The rewriting unit 27 rewrites the values of the pointer variables with the reference destination addresses (first variable reference destination addresses) indicating the storage areas of the target variables in the pre-update firmware 221, or with the reference destination addresses held by the pointer variables of the post-update firmware 222.

As a result of such a configuration, the optical access device 2 is capable of continuing optical communication processing even when the memory 22 stores a plurality of post-update firmware.

(Modification 3)

As a result of applying the first and second exemplary embodiments, an overhead duration corresponding to the acquisition of variable addresses in the pre-update firmware 221 is added to the processing time of the executed programs. The overhead duration is an extremely small effect compared to the processing duration of the programs. However, depending on the OLT hardware specifications to which the present invention is applied, there is a possibility of an abnormal stop of the programs occurring if the frequency of variable address acquisition within the programs increases. Therefore, the present invention is desirably applied giving consideration to the hardware specifications of the application target OLT, the processing time required for the application destination programs, the application destination programs, and the frequency of variable address acquisition are executed, and the like.

(Modification 4)

The rewriting unit 27 described above may be realized by an information processing device such as a personal computer or smart device connected to the optical access device 2. For example, the processor of an information processing device connected to the optical access device 2 may function as the rewriting unit 27 by executing the programs described above.

(Third Embodiment)

An example of the configuration of an optical communication system 1 according to the first and second exemplary embodiments above will be described prior to describing a third exemplary embodiment.

Figure 9:
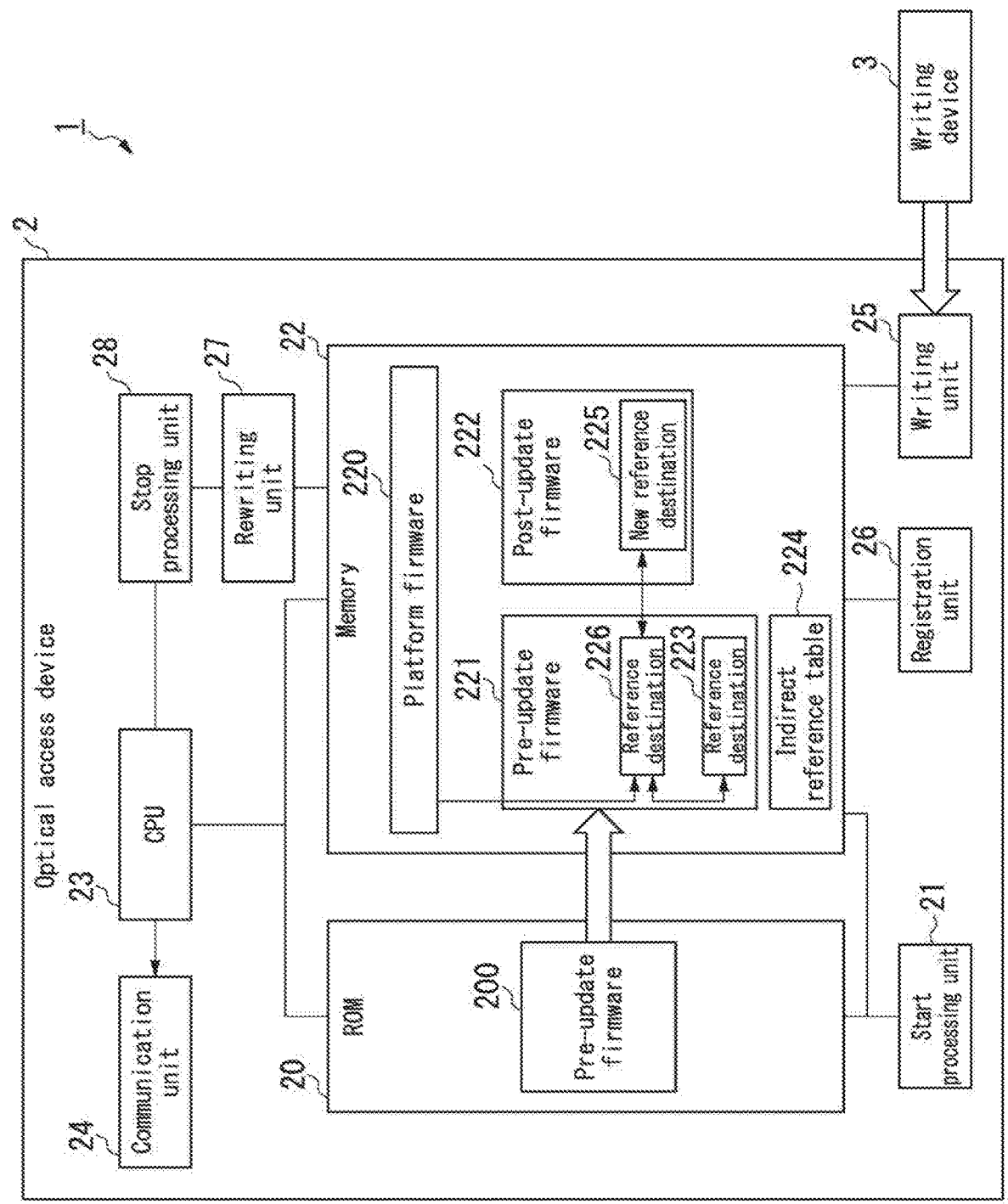
FIG. 9 is a diagram showing an example of the configuration of an optical communication system of the first and second exemplary embodiments.

FIG. 9 is a diagram showing an example of the configuration of the optical communication system 1 described in the first and second exemplary embodiments.

As shown in FIG. 9, the pre-update firmware 221 in the memory 22 has a reference source 226. As described in the first exemplary embodiment, the rewriting unit 27 rewrites the addresses (reference destinations 223) indicating the storage areas of the pre-update firmware 221 in the indirect reference table 224 with addresses (new reference destinations 225) indicating the storage areas of the post-update firmware 222. As a result, the CPU 23 is capable of referring to the function data and the like of the post-update firmware 222 instead of referring to the function data and the like of the pre-update firmware 221, when the function data and the like of the pre-update firmware 221 is called.

When the processing of the reference source 226 is executed, the CPU 23 refers to the indirect reference table 224 and refers to the function data of the post-update firmware 222 stored at the reference destination addresses (new reference destinations 225). At this time, the CPU 23 stores in a register that stores a return destination address (hereunder referred to as "return destination register") the return destination address of the pre-update firmware 221, which is the reference source 226. The return destination address refers to the return address destination of the processing executed by the CPU 23.

After referring to the function data of the post-update firmware 222, the CPU 23 refers to the data relating to the pre-update firmware 221 stored at the address indicated by the return destination register. As a result, in terms of the function data and the like, the CPU 23 is capable of referring to the function data of the pre-update firmware 221 except for predetermined function data.

In this manner, the optical access device 2 is capable of performing a firmware update without causing a communication disconnection. The optical access device 2 is capable of providing specific functions to the user without causing a communication disconnection. That is to say, the optical access device 2 is capable of performing live updates in which the firmware is dynamically updated.

(Third Embodiment)

The third exemplary embodiment differs from FIG. 9 in the aspect that the platform firmware 220 includes the reference source. The third exemplary embodiment will be described only in terms of the points of difference with respect to the first exemplary embodiment.

Figure 10:
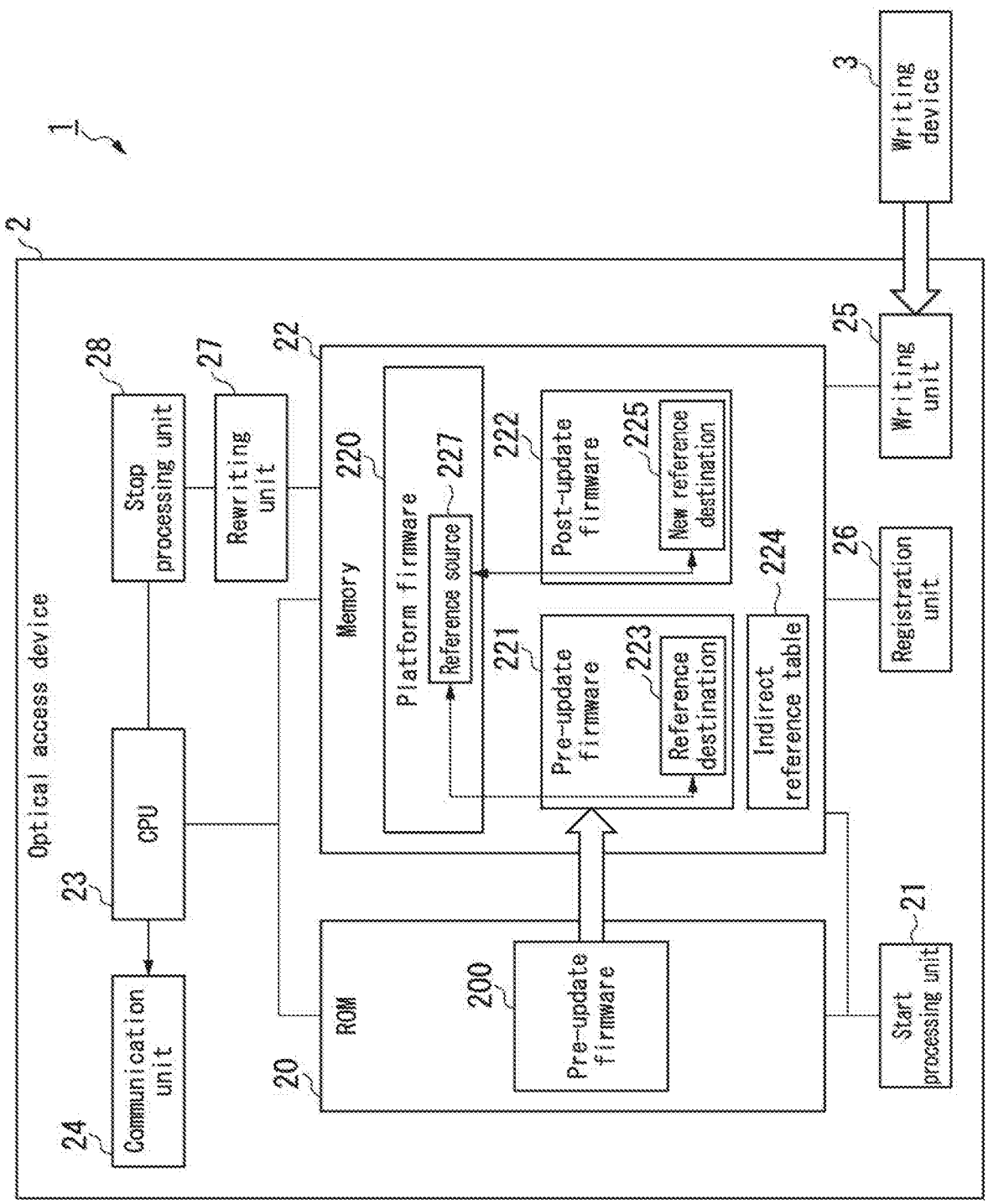
FIG. 10 is a diagram showing an example of the configuration of an optical communication system of a third exemplary embodiment.

FIG. 10 is a diagram showing an example of the configuration of an optical communication system 1 according to the third exemplary embodiment. In contrast to FIG. 9, the platform firmware 220 in the memory 22 includes the reference source 227.

The processing of the rewriting unit 27 is equivalent to that of FIG. 9. As shown in FIG. 10, the platform firmware 220 includes the reference source 227. As described in the first exemplary embodiment, the rewriting unit 27 refers to the indirect reference table 224, and rewrites the reference destination addresses (reference destinations 223) indicating the storage area of the pre-update firmware 221 with the reference destination addresses (new reference destination 225) indicating the storage area of the post-update firmware 222. As a result, the CPU 23 is capable of referring to the function data and the like of the post-update firmware 222 instead of referring to the function data of the pre-update firmware 221, when the function data of the platform firmware 220 is called.

In the manner above, the memory 22 additionally stores predetermined data relating to the platform firmware 220. The rewriting unit 27 rewrites the reference destination addresses indicating the storage areas in the first data referred from the platform firmware 220 with the reference destination addresses indicating the storage areas in the second data. As a result, the data referred to by the CPU 23 via the platform firmware 220 is rewritten from the first data to the second data. The communication unit 24 communicates on the basis of the second data referred to by the CPU 23.

Consequently, the optical access device 2 of the third exemplary embodiment is capable performing a firmware update without causing a communication disconnection, while reducing overheads relative to the first exemplary embodiment. That is to say, the optical access device 2 of the second exemplary embodiment is capable of performing a firmware update without causing a communication disconnection, while reducing overheads relative to a case where data relating to the post-update firmware 222 is referred to via the pre-update firmware 221.

(Fourth Embodiment)

A fourth exemplary embodiment is a combination of the first exemplary embodiment and the third exemplary embodiment.

Figure 11:
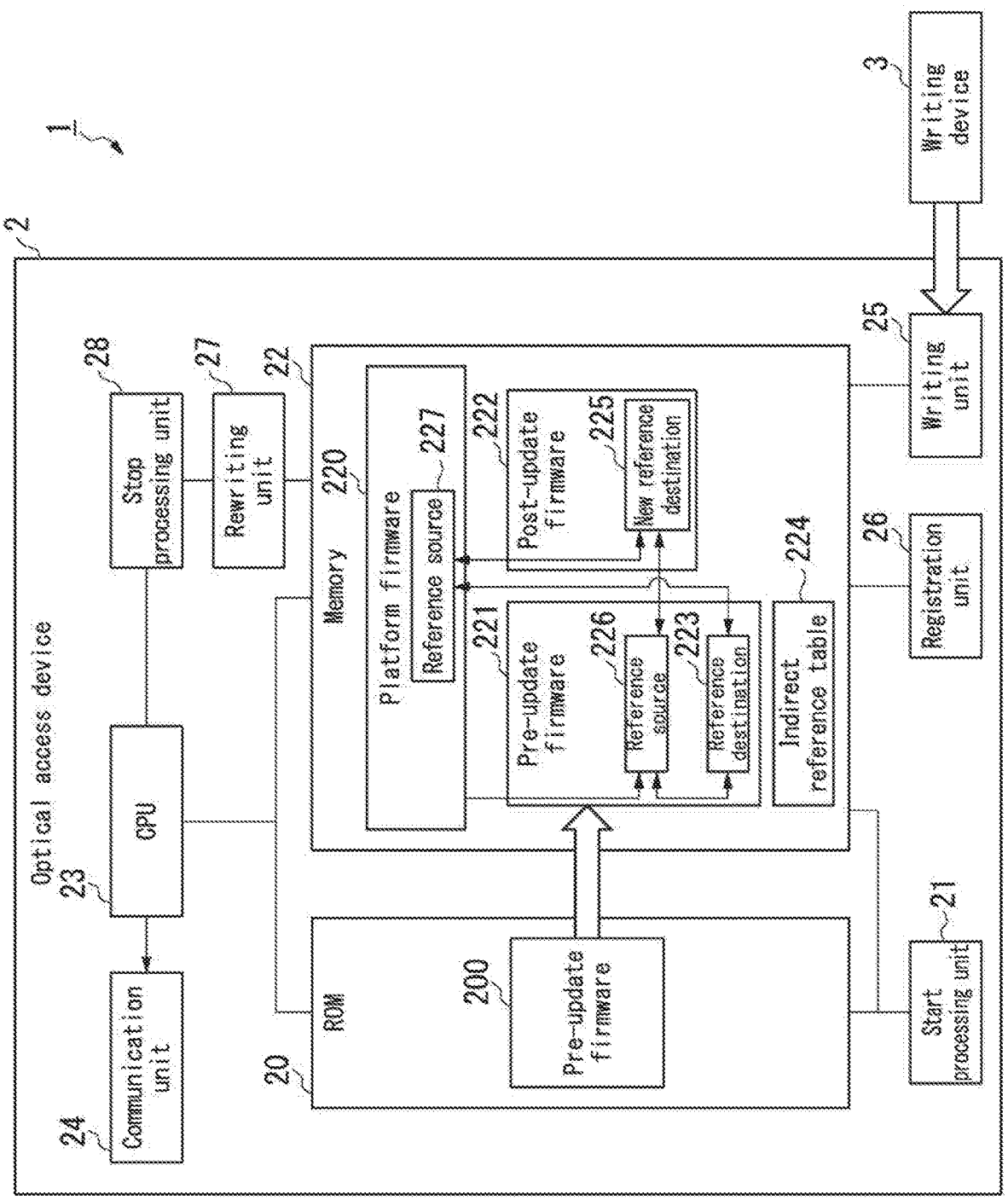
FIG. 11 is a diagram showing an example of the configuration of an optical communication system of a fourth exemplary embodiment.

FIG. 11 is a drawing showing an example of the configuration of an optical communication system 1 according to the fourth exemplary embodiment.

According to FIG. 11, the pre-update firmware 221 includes a reference source 226. Consequently, the reference destination addresses are switched between the addresses of the storage areas of the pre-update firmware 221 and the addresses of the storage areas of the post-update firmware 222, when the CPU 23 calls the function data and the like of the pre-update firmware 221.

According to FIG. 11, the platform firmware 220 includes a reference source 227. Consequently, the reference destination addresses are switched between the addresses of the storage areas of the pre-update firmware 221 and the addresses of the storage areas of the post-update firmware 222, when the CPU 23 calls the function data and the like of the platform firmware 220.

As described above, the functional units of the optical access device 2 of the fourth exemplary embodiment are a combination of the functional units of the optical access device of the first exemplary embodiment and the functional units of the optical access device 2 of the third exemplary embodiment. Consequently, the optical access device 2 of the fourth exemplary embodiment is capable of performing a firmware update without causing a communication disconnection due to a flexible switching operation, even if the overhead grows due to an increase in the frequency of referencing.

A plurality of embodiments and modifications have been described above. However, any of the plurality of embodiments, or any of the embodiments and modifications can be combined and applied. In those cases, an effect is obtained that combines the effect of each embodiment or modification.

In the embodiments described above, indirect referencing processing is additionally performed with respect to the executed programs by using function pointers and structures. Consequently, when a function is called, the address of the function at the reference destination held by the function pointer is read, and the processing is transferred to the address thereof. In this manner, in the embodiments described above, a case where the addresses held by the function pointers were rewritten was described. In other words, a case was described where the rewriting unit 27 rewrites the pre-update values in the indirect reference table 224 with predetermined values, or values in which a predetermined offset value has been added or subtracted.

However, the indirect reference table 224 may be efficiently rewritten. For example, a flag may be provided that indicates whether pre-update values are employed or post-update values are employed. The rewriting unit 27 refers to the value of the flag, and then determines whether or not to perform the rewrite according to the value of the flag. For example, if the value of the flag is "0", the rewriting unit 27 acquires the pre-update addresses from the indirect reference table 224. If the value of the flag is "1", the rewriting unit 27 acquires the reference destination addresses in the indirect reference table 224, and in effect, performs the rewrite.

The same applies to those cases an offset value is used. If the value of the flag is "0", the rewriting unit 27 acquires the pre-update address (for example, value "A") from the indirect reference table 224. If the value of the flag is "1", rather than acquiring the pre-update address (for example, value "A"), the rewriting unit 27 acquires an address in which an offset value (for example, value "B") is added or subtracted to or from the address (value "A+B" in the case of addition), acquires the indirect reference table 224, and in effect, performs the rewrite.

A flag may, for example, be provided for each firmware or function. Alternatively, a flag may be provided for each subroutine, and the value may also be dynamically updated. The rewrite processing using a flag is also applicable to rewrite processing of the variable table.

At least a portion of the optical access device 2 and the writing device 3 according to the embodiments described above may be realized by a computer. In this case, a program for realizing the functions may be recorded on a computer-readable recording medium, and the functions may be realized by a computer system reading and executing the program recorded on the recording medium. The "computer system" referred to here is assumed to include an OS and hardware such as a peripheral device. Furthermore, the "computer-readable recording medium" refers to a portable medium such as a flexible disk, a magneto-optical disk, a ROM, or a CD-ROM, or a storage device such as a hard disk built into the computer system. In addition, the "computer-readable recording medium" is assumed to include those that dynamically hold the program for a short period of time, such as a communication line in a case where the program is transmitted via a network such as the Internet, or a communication line such as a telephone line, and those that hold the program for a fixed period of time, such as the volatile memory inside the computer systems serving as the servers and clients in such a case. Moreover, the program described above may be one that realizes a portion of the functions mentioned above. Further, the program may be one capable of realizing the functions described above in combination with a program already recorded in the computer system, and may be realized by using a programmable logic device such as a FPGA (Field Programmable Gate Array).

In the embodiments described above, the reference destinations 223 are an example of first data, the reference destination addresses are an example of first reference destination addresses, the writing device 3 is an example of another device, the new reference destinations 225 are an example of second data, the new reference destination addresses are an example of second reference destination addresses, and the CPU 23 is an example of a processor.

The embodiments of the present invention have been described in detail above with reference to the drawings. However, specific configurations are in no way limited to the embodiments, and include designs and the like within a scope that does not depart from the spirit of the present invention.

INDUSTRIAL APPLICABILITY

The present invention may be applied to an optical access device such as a station side communication terminal.
Reference Symbols
1 Optical communication system
2 Optical access device
3 Writing device
20 ROM
21 Start processing unit
22 Memory
23 CPU
24 Communication unit
25 Writing unit
26 Registration unit
27 Rewriting unit
29 Assignment unit
200, 221 Pre-update firmware
220 Platform firmware
222 Post-update firmware
223 Reference destination
224 Indirect reference table
225 New reference destination

The invention claimed is:
1. A communication processing device comprising:
 a memory that stores first data relating to a pre-update firmware, and second data relating to a post-update firmware, and that stores a first reference destination address indicating a storage area of a reference destination included in the first data in association with the reference destination;
 a rewriting circuit configured to rewrite at least some of the first reference destination address stored in the memory with a second reference destination address indicating the storage area of the reference destination in the second data; and
 a processor configured to, when referring to the reference destination in the first data, refer to the second data based on the second reference destination address stored in the memory,
 wherein the second data includes a first variable of at least one of a plurality of variables commonly included in the first data and the second data, and a second variable that holds a fourth reference destination address indicating a storage area storing the first variable,
 the memory stores the first data and the second data in a first storage area and a second storage area, respectively, and stores the fourth reference destination address indicating the first variable of the second data in the second storage area in association with the second variable of the second data in the second storage area,
 the rewriting circuit rewrites a value of the second variable with a first variable reference destination address indicating the first variable of the first data in the first storage area, and
 the processor refers to the first variable of the first data in the first storage area based on the first variable reference destination address held by the second variable of the second data in the second storage area.
2. The communication processing device according to claim 1, wherein the rewriting circuit rewrites the first reference destination address stored in the memory with the second reference destination address according to a rewrite instruction.

3. The communication processing device according to claim 1, wherein the rewriting circuit rewrites the first reference destination address stored in the memory with the second reference destination address by adding a predetermined offset value to the first reference destination address.

4. The communication processing device according to claim 1, wherein the memory further stores data relating to a platform firmware,
wherein the processor, when referring to the reference destination in the first data via the platform firmware that is referred to, refers to the second data based on the second reference destination address stored in the memory.

5. The communication processing device according to claim 1 further comprising:
a writing circuit configured to write the second data to the free storage area when the memory has a free storage area for the second data to be written.

6. The communication processing device according to claim 1 further comprises:
a stop processing unit configured to set a guard time duration,
wherein the processor stops, for the guard time duration set by the stop processing unit, all processing except for the processing by the rewriting circuit that rewrites the first reference destination address with the second reference destination address, or all processing except for processing having a higher priority than the rewrite processing.

7. The communication processing device according to claim 6, wherein the rewriting circuit determines whether or not either a number of first reference destination addresses targeted for rewriting is greater than or equal to a first threshold value or a restriction duration of the functions that are restricted by the rewrite processing is greater than or equal to a second threshold value, and the stop processing unit sets the guard time based on at least either a number of rewrites or the restriction duration if at least either the number of rewrites is determined to be greater than or equal to the first threshold value of the restriction duration is determined to be greater than or equal to the second threshold value.

8. The communication processing device according to claim 1, wherein, when third data representing other data relating to the post-update firmware is stored in the memory, the rewriting circuit rewrites at least some of the first reference destination address with the second reference destination address or with a third reference destination address indicating the storage area of the reference destination in the third data, or rewrites at least some of the second reference destination address with the third reference destination address.

9. The communication processing device according to claim 1, wherein the rewriting circuit performs the rewrite with respect to the first variable commonly included in the first data and the second data.

10. The communication processing device according to claim 1, wherein the rewriting circuit rewrites, when third data representing other data relating to the post-update firmware is stored in the memory, the values of a third variable, which is stored in a different area than the storage areas of the first and second data and holds a reference destination address indicating the storage area of at least some of the first variable, with the first variable reference destination address or with the fourth reference destination address held by the second variable of the second data.

11. The communication processing device according to claim 1, further comprising a communication unit configured to communicate based on the second data referred to by the processor.

12. An information processing device comprising:
a memory that stores first data which is data relating to a pre-update firmware, and second data which is data relating to a post-update firmware, and that stores a first reference destination address indicating the storage area of a reference destination included in the first data in association with the reference destination; and
a processor connected to the memory, wherein the processor rewrites at least some of the first reference destination address stored in the memory with a second reference destination address indicating the storage area of the reference destination in the second data, and refers to the second data based on the second reference destination address stored in the memory when referring to the reference destination in the first data,
wherein the second data includes a first variable of at least one of a plurality of variables commonly included in the first data and the second data, and a second variable that holds a fourth reference destination address indicating a storage area storing the first variable,
the memory stores the first data and the second data in a first storage area and a second storage area, respectively, and stores the fourth reference destination address indicating the first variable of the second data in the second storage area in association with the second variable of the second data in the second storage area,
the processor rewrites a value of the second variable with a first variable reference destination address indicating the first variable of the first data in the first storage area, and
the processor refers to the first variable of the first data in the first storage area based on the first variable reference destination address held by the second variable of the second data in the second storage area.

13. A communication processing device control method comprising the steps of:
storing first data which is data relating to a pre-update firmware, and second data which is data relating to a post-update firmware, and storing a first reference destination address indicating the storage area of a reference destination included in the first data in association with the reference destination;
rewriting at least some of the first reference destination address with a second reference destination address indicating the storage area of the reference destination in the second data; and
referring to the second data based on the stored second reference destination address when referring to the reference destination in the first data,
wherein the second data includes a first variable of at least one of a plurality of variables commonly included in the first data and the second data, and a second variable that holds a fourth reference destination address indicating a storage area storing the first variable, and
the communication processing device control method further comprises:
storing the first data and the second data in a first storage area and a second storage area, respectively, and stores the fourth reference destination address indicating the first variable of the second data in the second storage area in association with the second variable of the second data in the second storage area, rewriting a value of the second variable with a first variable reference destination address indicating the first variable of the first data in the first storage area, and referring to the first variable of the first data in the first storage area based on the first variable reference destination address held by the second variable of the second data in the second storage area.

\* \* \* \* \*